United States Patent
Takahashi

(10) Patent No.: US 6,975,389 B2
(45) Date of Patent: Dec. 13, 2005

(54) DEFLECTION ANGLE MEASURING DEVICE, OPTICAL SIGNAL SWITCHING SYSTEM, INFORMATION RECORDING AND REPLAYING SYSTEM, DEFLECTION ANGLE MEASURING METHOD, AND OPTICAL SIGNAL SWITCHING METHOD

(75) Inventor: Koichi Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 296 days.

(21) Appl. No.: 10/389,913

(22) Filed: Mar. 18, 2003

(65) Prior Publication Data

US 2003/0179366 A1 Sep. 25, 2003

(30) Foreign Application Priority Data

Mar. 20, 2002 (JP) .................................... P2002-079150

(51) Int. Cl.$^7$ ............................. G01C 1/06; G02B 6/26
(52) U.S. Cl. ........................................ 356/139; 385/15
(58) Field of Search ................................ 356/138–139, 356/614, 615, 622, 213, 218, 222; 385/17, 18

(56) References Cited

U.S. PATENT DOCUMENTS 5,046,843 A * 9/1991 Keren .................. 356/139.03
5,760,944 A * 6/1998 Minakuchi et al. ......... 359/211
2004/0027561 A1 * 2/2004 Takahashi et al. ....... 356/152.2
2004/0091200 A1 * 5/2004 Ikegame ...................... 385/18

FOREIGN PATENT DOCUMENTS

| JP | 02-289928 | 11/1990 |
| JP | 08-227552 | 9/1996 |
| JP | 11-144273 | 5/1999 |
| JP | 11-144274 | 5/1999 |

* cited by examiner

Primary Examiner—Michael P. Stafira
(74) Attorney, Agent, or Firm—Kenyon & Kenyon

(57) ABSTRACT

A light of measurement emitted from a semiconductor laser (1) is incident to a beam splitter formed by a prism (4). The light of measurement transmits into an incident surface (3) having a positive power so as to be emitted to a reflecting surface (5c) of measurement. A light reflected there is returned by a beam splitting surface (4a) so as to be reflected by a concave reflecting surface (6). The reflected light is returned so as to be condensed and focused on a light receiving surface (8) of sensor in a light measuring device (7). A position of a spot of light which is received is measured so as to measure the deflection angle of a rotating mirror (5). By doing this, it is possible to form a compact device even if the length of the optical path is long. As a result, it is possible to broaden the deflection angle measuring range.

45 Claims, 16 Drawing Sheets

DEFLECTION ANGLE MEASURING DEVICE, OPTICAL SIGNAL SWITCHING SYSTEM, INFORMATION RECORDING AND REPLAYING SYSTEM, DEFLECTION ANGLE MEASURING METHOD, AND OPTICAL SIGNAL SWITCHING METHOD

BACKGROUND OF THE INVENTION

1. Field of the Invention

The present invention relates to a deflection angle measuring device, an optical signal switching system, an information recording and replaying system, deflection angle measuring method, and optical signal switching method.

The present application is based on patent application No. 2002-79150 filed in Japan, the content of which is incorporated herein by reference.

2. Description of Related Art

In recent years, technology for optical information communication and optical information recording has been developed tremendously; thus, information transmitting density and information recording density have increased greatly. In this technology area, it is necessary that a technique for measuring and controlling an inclination of an light deflecting mirror accurately so as to be used in for an optical signal switch for optically switching optical fiber networks and relay stations and a tracking-control for an optical pickup in an optical information recording and replaying system improves.

For such a purpose, various sensors for measuring the deflection angle have been proposed conventionally.

Such a conventional technology is disclosed in prior art documents such as Japanese Unexamined Patent Application, Second Publication No. Hei7-66554, Japanese Unexamined Patent Application, First Publication, No. Hei8-227552, Japanese Unexamined Patent Application, First Publication, No. 11-144273, and Japanese Unexamined Patent Application, First Publication, No. 11-144274.

In Japanese Unexamined Patent Application, Second Publication No. Hei7-66554, a device for measuring a relative angle between a light path of a beam which is emitted from an optical pickup to a recording medium and a recording surface on the recording medium. Such a device is provided with an illuminating element for emitting a light to a recording surface and two light receiving element which are disposed on both sides of the illuminating element for detecting a light which is reflected from the recording surface. In this technique, a difference between the amount of the reflected lights which are detected by two light receiving elements are measured so as to measure an amount of inclination of the recording medium.

In Japanese Unexamined Patent Application, First Publication, No. Hei 8-227552, a device for measuring a relative angle between a light path of a beam which is emitted from an optical pickup to a recording surface and a recording surface on the recording medium is also disclosed. This device receives a light which is reflected at the recording medium at a light-receiving surface which is divided in four regions so as to measure an amount of inclination in two directions according to the amount of received light.

Also, in Japanese Unexamined Patent Application, First Publication, No. 11-144273, and Japanese Unexamined Patent Application, First Publication, No. 11-144274, it is disclosed that an angle-measuring light flux is emitted to a galvano-meter mirror which is used for a fine-movement tracking of an optical pickup, and an amount of the light which is reflected there is measured by a light measuring device through a beam splitter of which reflection ratio changes according to an incident angle; thus, an inclination angle is measured.

Also, in particular, a conventional optical signal switching system such as an optical MEMS (Micro Electro Mechanical Systems) switches the angle of a light deflecting mirror at a predetermined deflection angle according to a predetermined signal.

SUMMARY OF THE INVENTION

In a first aspect of the present invention, a deflection angle measuring device for measuring a deflection angle of an optical deflecting element for deflecting a light comprises a light source for emitting a light toward a reflecting surface of measurement for which is provided in the optical deflecting element, a beam splitter for changing at least a part of a light path of a reflected light which is reflected at the reflecting surface, a concave reflecting surface which is disposed on a light path which is changed by the beam splitter, a light measuring device for measuring the deflection angle of the light which is reflected at the concave reflecting surface and deflected by the optical deflecting element according to a light receiving position so as to face the concave reflecting surface.

Here, in the present application, a deflection angle by an light deflecting element is an inclination angle of a reflecting surface on the light deflecting element.

It is acceptable that a beam splitter is a prism which transmits a light which is emitted from the light source; and the prism has a beam splitting surface for dividing a light which is reflected by the reflecting surface of measurement.

It is acceptable that a concave reflecting surface is disposed on an opposite end to a convex surface which is disposed on the prism.

It is acceptable that, in the prism, a surface which faces the light source has a positive power.

It is acceptable that, in the prism, a surface which faces the light source is a Fresnel lens surface.

It is acceptable that, in the prism, a surface which faces the light measuring device has a negative power.

It is acceptable that, in the prism, a surface which faces the light measuring device is a Fresnel lens surface.

It is acceptable that, in the prism, a surface which faces the light measuring device is an aspherical surface.

It is acceptable that the beam splitter is formed by parallel flat plates which transmit the light emitted from the light source.

It is acceptable that the concave reflecting surface is disposed on an opposite end to a plano-convex lens.

It is acceptable that a lens having a positive power is disposed between the parallel flat plates and the light source.

It is acceptable that the lens having a positive power is a Fresnel lens.

It is acceptable that a lens having a negative power is disposed between the parallel flat plates and the light measuring device.

It is acceptable that the lens having a negative power is a Fresnel lens.

It is acceptable that the lens having a negative power is an aspherical lens having a negative power.

It is acceptable that, in a deflection angle measuring device, the beam splitter has a polarized beam splitting surface for transmitting or reflecting a light according to a polarization component. Also it is acceptable that ¼ wavelength plates are disposed between the reflecting surface of measurement and the polarized beam splitting surface and between the concave reflecting surface and the polarized beam splitting surface respectively.

It is acceptable that a polarizing element for converting a light which is incident to the polarized beam splitting surface to a linear polarization is provided between the light source and the polarized beam splitting surface.

It is acceptable that the light source is a semiconductor laser element.

It is acceptable that the light source is a semiconductor laser element. Also it is acceptable that a lens having a positive power is disposed in a laser emitting mouth on the semiconductor laser element.

It is acceptable that the lens having a positive power is a Fresnel lens.

It is acceptable that the light measuring device is a one-dimensional position measuring light receptor.

It is acceptable that the light measuring device is a tw-dimensional position measuring light receptor.

It is acceptable that the light measuring device is provided with a light receiving surface which is divided in four portions.

In the present invention, it is acceptable that an optical signal switch system comprises an input cable unit which is provided with at least an input cable inside of which an optical signal is transmitted, an output cable unit which is provided with at least an output cable which receives the optical signal which is transmitted inside the input cable and transmits thereinside, an optical switching device which is disposed between the input cable unit and the output cable unit so as to selectively transmit the optical signal which is transmitted from at least one of the input cables to at least one cable in the output cable unit. Also, it is acceptable that the optical switching device comprises a light deflecting element which is disposed to be inclined at a predetermined deflecting angle so as to selectively change a light path of the optical signal which is transmitted in the input cable, and a deflection angle measuring device for measuring the deflecting angle of the light deflecting element. Also, it is acceptable that the deflection angle measuring device comprises a light source which emits a light toward a reflecting surface which is disposed on the light deflecting element, a concave reflecting surface for reflecting a light which is reflected at the reflecting surface of measurement, and a light measuring device for measuring a deflection angle of at the light deflecting element according to a light receiving position where the light which is reflected at the concave reflecting surface is received.

It is acceptable that a beam splitter is provided between the light source and the reflecting surface so as to reflect a light which is reflected at the reflecting surface of measurement and change a light path of at least a part of the reflected light toward the concave reflecting surface.

It is acceptable that the beam splitter in the deflection angle measuring device is a prism which transmits a light emitted from the light source.

It is acceptable that the concave reflecting surface in the deflection angle measuring device is disposed on an opposite end to a convex surface which is disposed on the prism.

It is acceptable that, in the prism which is disposed in the deflection angle measuring device, a surface which faces the light source has a positive power.

It is acceptable that a beam splitter in the deflection angle measuring device is formed by parallel flat plates which transmit a light emitted from the light source.

It is acceptable that the concave reflecting surface in the deflection angle measuring device is disposed on an opposite end to a plano-convex lens.

It is acceptable that a lens having a positive power is disposed between the parallel flat plates in the deflection angle measuring device and the light source.

It is acceptable that the beam splitter has a polarized beam splitting surface for transmitting or reflecting a light according to a polarization component. Also it is acceptable that ¼ wavelength plates are disposed between the reflecting surface of measurement and the polarized beam splitting surface and between the concave reflecting surface and the polarized beam splitting surface respectively.

It is acceptable that a polarizing element for converting a light which is incident to the polarized beam splitting surface into a linear polarization is provided between the light source and the polarized beam splitting surface.

It is acceptable that the light measuring device is a one-dimensional position measuring light receptor.

It is acceptable that the light measuring device is a two-dimensional position measuring light receptor.

It is acceptable that the light measuring device is provided with a light receiving surface which is divided in four portions.

It is acceptable that the light deflecting element is formed by a galvano-meter mirror.

It is acceptable that at least one of an end of the input cable in the input cable unit or an end of the output cable in the output cable unit is disposed in lattice matrix.

It is acceptable that at least one of the input cable or the output cable is an optical fiber.

In the present invention, it is acceptable that an information recording and replaying system comprises a recording medium having a recording surface which can record and/or replay an information signal by emitting a light thereto, a light source which emits a light flux for recording and/or replaying the information signal to the recording medium, an optical system for focusing the light flux on a recording surface on the recording medium, a light deflecting element which is disposed in the optical system for deflecting the light flux in a surface parallel with the recording surface and has a reflecting surface of measurement of which inclination angle changes synchronously according to the deflection angle, and a deflection angle measuring device for measuring the deflection angle of the light deflecting element. Also, it is acceptable that the deflection angle measuring device is provided with a light source for emitting a light to a reflecting surface of measurement which is disposed on the light deflecting element, a concave reflecting surface for reflecting a light which is reflected at the reflecting surface of measurement, a light measuring device for receiving a light which is reflected at the concave reflecting surface and measures the deflection angle at the light deflecting element.

It is acceptable that a beam splitter for switching at least a part of a light which is reflected at a reflecting surface of measurement to a light path which is directed to a concave reflecting surface is disposed between the light source and the reflecting surface.

In the present invention, it is acceptable that deflection angle measuring method for measuring a deflection angle at a light deflecting element by emitting a measurement light to a reflecting surface of measurement which is disposed on a light deflecting element for deflecting a light by inclining a reflecting surface comprises steps of emitting a measurement light on a reflecting surface on the light deflecting element by transmitting a part of a measurement light through a beam splitter, reentering a light which is reflected at the reflecting surface of measurement so as to be incident to a surface of the beam splitter and switching a light path of at least a part of the light, reflecting the light of which light path is switched at the concave reflecting surface, receiving a light which is reflected at the concave reflecting surface by the light measuring device, and measuring a position for where the reflected light is received by the light measuring device so as to measure the deflection angle.

In the present invention, it is acceptable that optical signal switching method for selectively entering an optical signal which is emitted from at least one of a plurality of input cables to be incident to at least one of a plurality of output cables and transmitting the optical signal in the output cables comprises steps of specifying a position of the input cable, among a plurality of input cables, from which the optical signal is emitted and a position of the output cable which is selected, specifying a deflection angle of a light deflecting element for reflecting a light which is emitted from the input cable of which position is specified to the selected output cable, emitting a light for measuring the deflection angle to a reflecting surface of measurement which is disposed on the light deflecting element and reflecting the light thereat, returning a light path of the reflected light via a concave reflecting surface and receiving the reflected light by the light measuring device, measuring the deflection angle of the light deflecting element according to a position where the light is received, adjusting the deflection angle of the light deflecting element so as to be a predetermined angle, and entering the optical signal to be incident to the selected output cable such that the optical signal is selectively transmitted.

In the present invention, it is acceptable that, in optical signal switching method, a light for measuring the deflection angle is emitted to a reflecting surface of measurement via a beam splitter, a light which is reflected at the reflecting surface is reflected at the concave reflecting surface via the beam splitter, and a light transmits through the beam splitter so as to be introduced to the light measuring device.

DETAILED DESCRIPTION OF THE INVENTION

Figure 1:
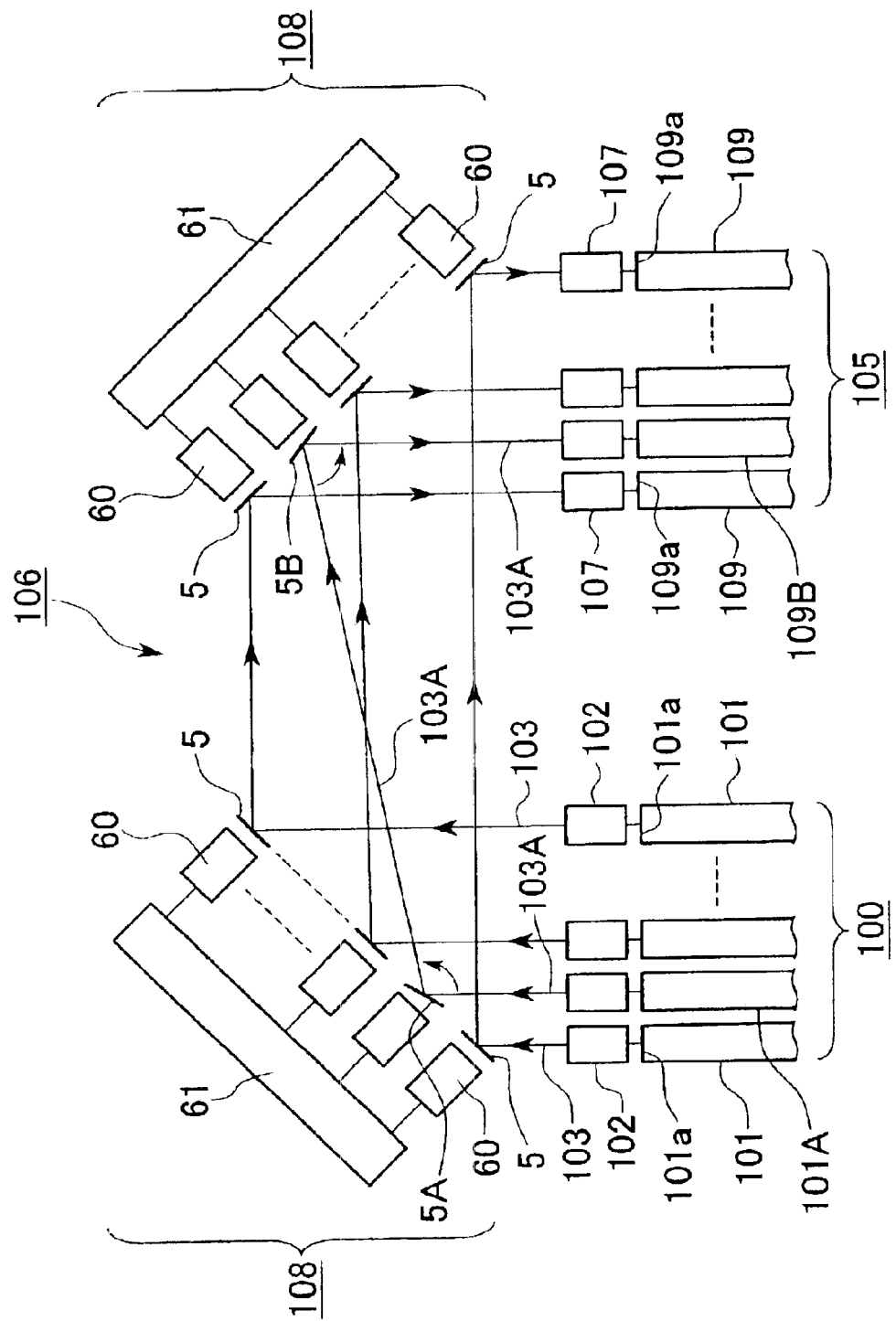
FIG. 1 is a schematic view for showing a general structure of an optical signal switching system 106 according to the present invention.

Embodiments of the present invention are explained as follows with reference to drawings. Same reference numeral is added to a member which is the same or equivalent in all drawings. Therefore, in general, explanation for a member which is added the same reference numeral is omitted among different embodiments.

A deflection angle measuring device according to the present invention measures a deflection angle by emitting a light to a light deflecting element which deflects a light. Therefore, the present invention can be employed in various systems which are provided with such a light deflecting element.

Hereafter, a light which is emitted for measuring a deflection angle is called a light of measurement so as to distinguish from a light which is deflected by a light deflecting element.

For such light deflecting element, for example, a galvanometer mirror in which a mirror for deflecting a light is retained by a rotating member such as a magnetic coil so as to freely rotate, a rotating multi-mirror in which a plurality of mirror surfaces for deflecting a light are attached to a motor shaft, a movable mirror in which a mirror for deflecting a light is retained by an actuator so as to change a setting angle, or an element in which a prism or a hologram is disposed so as to freely move for deflecting a light can be named.

Also, for a system which is provided with such a light deflecting element, an optical signal switch or an information recording and replaying system (optical information recording and replaying system) can be named.

First, a conventional deflection angle measuring device and an optical signal switching system according to the present invention are explained as follows. Accordingly, a deflection angle measuring device according to the present invention is explained. At last, an information recording and replaying system using a deflecting angle measuring device according to the present invention is explained.

In a conventional technique for the present invention, a light path is made relatively compact by using a beam splitter so as to measure a deflection angle in relatively a wide range by using a position measuring light receptor as a light measuring device. A deflection angle measuring device according the conventional technique is shown in FIG. 20.

Figure 20:
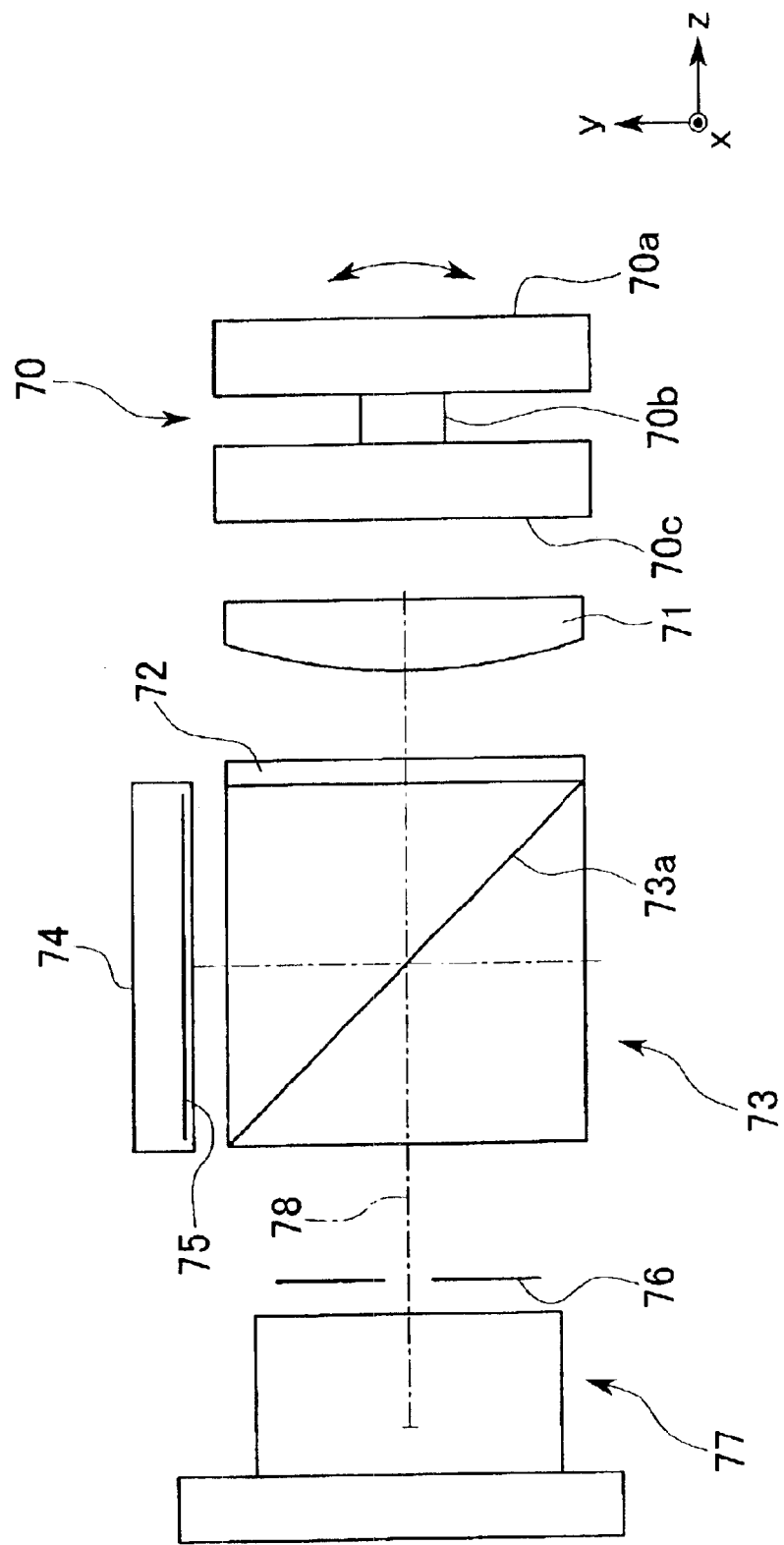
FIG. 20 is a general view of a conventional deflection angle measuring device.

FIG. 20 shows a general view of such a conventional deflection angle measuring device. In an xyz coordinate system shown in the drawing, an x-direction indicates a direction which is orthogonal to a surface of the drawing. A y-direction and a z-direction are parallel with a drawing. More particularly, y-axis and z-axis are in an orthogonal coordinate system in which y-axis is directed to an upper direction in the drawing and a positive direction of the z-direction is directed to a right-hand direction in the drawing.

The device according to the present invention is provided with a semiconductor laser 77 for a light source for emitting a light. An aperture 76, a polarizing beam splitter 73, ¼ wavelength plate 72, a light condensing lens 71 are provided in such an order in a direction of a passage of a light. The light condensing lens 71 faces a reflecting surface of measurement 70c which is provided on a part of a rotating mirror 70. Also, a position measuring light receptor 74 is provided in a direction in which the polarizing beam splitter 73 divides the light. Each member is explained in details as follows.

A rotating mirror 70 is a light deflecting element such as a galvano-meter mirror which is used in, for example, an optical signal switch or an optical information recording and replaying device. The reflecting surface of measurement 70c is provided on a back surface of a polarizing mirror surface 70a for deflecting a light in the rotating mirror 70 via a fixing member 70b so as to change an inclination angle while interacting with the change in the deflection angle of the deflecting mirror surface 70a.

The aperture 76 is provided with a circular opening mouth for forming a beaming shape of the laser light flux which is emitted from the semiconductor laser 77.

The polarizing beam splitter 73 is provided with a polarizing beam splitter surface 73a which transmits approximately 100% of P-polarization component of the laser light flux in a direction of a light axis 78 and reflects approximately 100% of an S-polarization component in a y-direction orthogonal to the light axis 78.

The light condensing lens 71 is a lens which has a positive power.

A light receiving surface 75 which is formed by a photoelectric element is provided in the position measuring light receptor 74. The light receiving surface 75 faces toward the polarizing beam splitter 73. The light receiving surface 75 is a one-dimensional position sensitive detector (which is commonly called a PSD) which generates a voltage which corresponds to a position of a light intensity center of a light spot when a light spot is emitted and measures a position of the spot.

In this structure, a laser light flux as a light of measurement for measuring a deflection angle is emitted from the semiconductor laser 77; thus, a beam shape is formed in the aperture 76. The light of measurement is incident to the polarizing beam splitter 73. The P-polarization component of the laser light flux passes linearly so as to transmit the polarizing beam splitter surface and converted to a circular polarized light at the ¼ wavelength plate 72. The laser light flux is condensed in the light condensing lens 71 and emitted to the reflecting surface 70c of measurement. The laser light flux is reflected by the reflecting surface 70c of measurement and transmitted through the light condensing lens 71 so as to further be condensed. The laser light flux transmits the ¼ wavelength plate 72. By doing this, the laser light flux is converted to a linearly polarized light having only the S-polarization component from the circular polarized light. Furthermore, the laser light flux is reflected by a polarizing beam splitter surface in the positive direction in the y-axis, and a spot having a predetermined size is focused on the position measuring light receptor 74.

The position of the spot is measured according to an output from the position measuring light receptor 74. There is a relationship for optical layout between the position of the spot and the deflection angle of the reflection angle 70c of measurement; thus, it is possible to measure the deflection angle.

According to such a conventional technique, a light path is formed from the polarizing beam splitter 73 to the reflecting surface 70c of measurement; thus, there was an advantage in that the device is compact and it was possible to make length of the light path relatively longer in relatively a small area which is available to use.

The present invention intends to make the light path compact and improve the measurement accuracy along with above advantages in the conventional technique.

Next, an optical signal switching system according to a first embodiment of the present invention is explained. In FIG. 1, an optical signal switching system 106 according to the present invention is shown.

The present system comprises an input cable unit 100 which is formed by bundling light transmitting cables such as optical fiber cable in which a laser light flux 103 (optical signal) of which intensity, pulse width, and frequency are modulated according to an information signal is transmitted thereinside, an output cable unit 105 which is formed by bundling light transmitting cables such as optical fiber cable in which a laser light flux 103 is transmitted thereinside, and an optical switching device 108, 108 which are disposed between the above units for deflecting the light flux 103.

The input cable unit 100 is formed by bundling a plurality of input cables 101 which are provided with emitting mouths 101a for emitting a laser light flux 103 to thereoutside which is transmitted thereinside at and ends of a light transmission cable which is formed by an optical fiber cable by coating a drawn glass fiber. Collimator units 102 are disposed on a light path of each emitting mouth 101a so as to function such that the laser light flux 103 is a parallel light flux. Directions of the emitting mouth 101a of the input cable 101 are aligned so as to have a predetermined intervals without irregularity. The emitting mouths 101a are disposed in a lattice matrix such as 2×2, or 64×64 according to the amount of the emitting mouths.

The output cable unit 105 is formed by bundling a plurality of the output cable 109 which is provided with an incident mouth 109a to which a laser light flux 103 is incident at an end of the optical transmission cable. A focusing unit 107 for focusing the laser light flux 103 is disposed on an optical axis of each incident mouth 109a. Each incident mouth 109a in the output cable 109 is disposed so as to align the incident direction with a predetermined interval. The incident mouths 109a are disposed in a lattice matrix such as 2×2, or 64×64 according to the amount of the emitting mouths.

An optical switching device 108 is disposed in an output/incident direction of the laser light flux 103 in the input cable unit 100 and the output cable unit 105. An optical switching device 108 comprises a rotating mirror 5 (light deflecting element) which can incline in one-dimensional manner or two-dimensional manner independently, a deflection angle measuring device 60 for measuring an inclination angle (deflection angle) from a neutral position, and a deflection angle control device 61 which controls the deflection angle of the rotating mirror 5 by an output from the deflection angle measuring device 60.

The optical switching devices 108, 108 are disposed under condition that each rotating mirror 5 is disposed so as to correspond to the emitting mouths 101a and the incident mouth 109a and the laser light flux 103 which is emitted from a predetermined emitting mouth 101a is reflected by each rotating mirror 5, 5 so as to be incident to a predetermined incident mouth 109a while the rotating mirror 5 is inclined in a neutral position.

Figure 2:
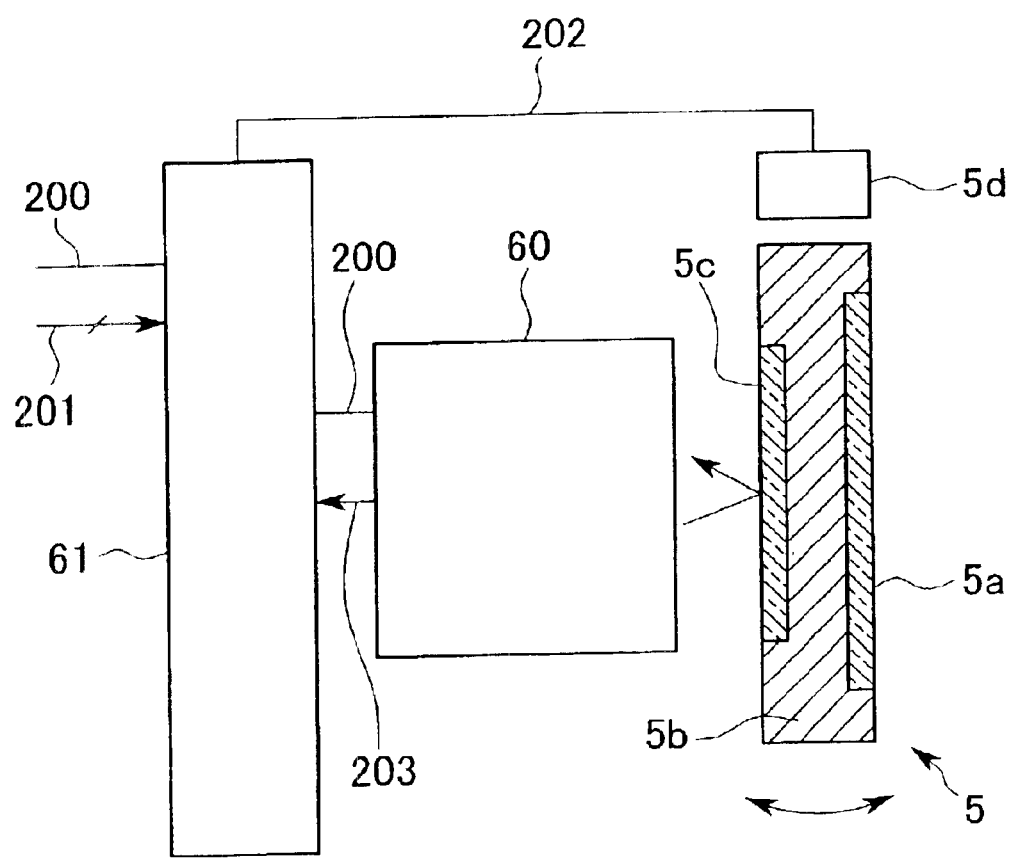
FIG. 2 is a view for showing a rotating mirror (5) and a peripheral structure therearound.

FIG. 2 is a view showing a cross section orthogonal to a reflecting surface of the rotating mirror 5 and peripheral structure.

In FIG. 2, for example, a rotating mirror 5 employs a galvano-meter mirror. In this example, a deflecting mirror surface 5a for reflecting the laser light flux 103 is formed on a front surface of a supporting member 5b and a reflecting surface 5c of measurement is formed on a back surface of a supporting member 5b by embedding a surface reflecting flat mirror on a front surface and a back surface of the supporting plate member 5b which is supported so as to freely adjust the inclination angle which is adjusted by a common actuator 5d such as a magnetic coil.

Although it is not necessary that the deflecting mirror surface 5a and the reflecting surface 5c of measurement are parallel, the reflecting surface 5c is attached so as to incline to correspond to the deflection angle of the deflecting mirror surface 5a. In an example shown in the drawing, the deflecting mirror 5a and the reflecting surface 5c of measurement are fixed to the supporting member 5b respectively. Therefore, the deflecting mirror surface 5a and the reflecting surface 5c of measurement have a common center for rotating therearound. Also, surface finish and reflection ratio are set so as to be appropriate according to a light of measurement and the laser light flux 103.

The rotating mirror 5 is disposed such that the deflecting mirror surface 5a is disposed in a direction in which the laser light flux 103 is incident and a deflection angle measuring device 60 faces for measuring the deflection angle is disposed on the reflecting surface 5c which is a back surface thereof.

The deflection angle controlling device 61 receives a deflection angle controlling signal 201 for specifying the rotating mirror 5 and its deflection angle and a power supply voltage 200 from outside. The deflection angle controlling device 61 is connected to an actuator 5d and the deflection angle measuring device 60 electrically and puts out a driving signal 202 for driving the actuator 5d; a measurement level signal 203 is put in from the deflection angle measuring device 60 which measures the deflection angle of the rotating mirror 5.

Next, the deflection angle measuring device 60 is explained in detail.

Figure 3:
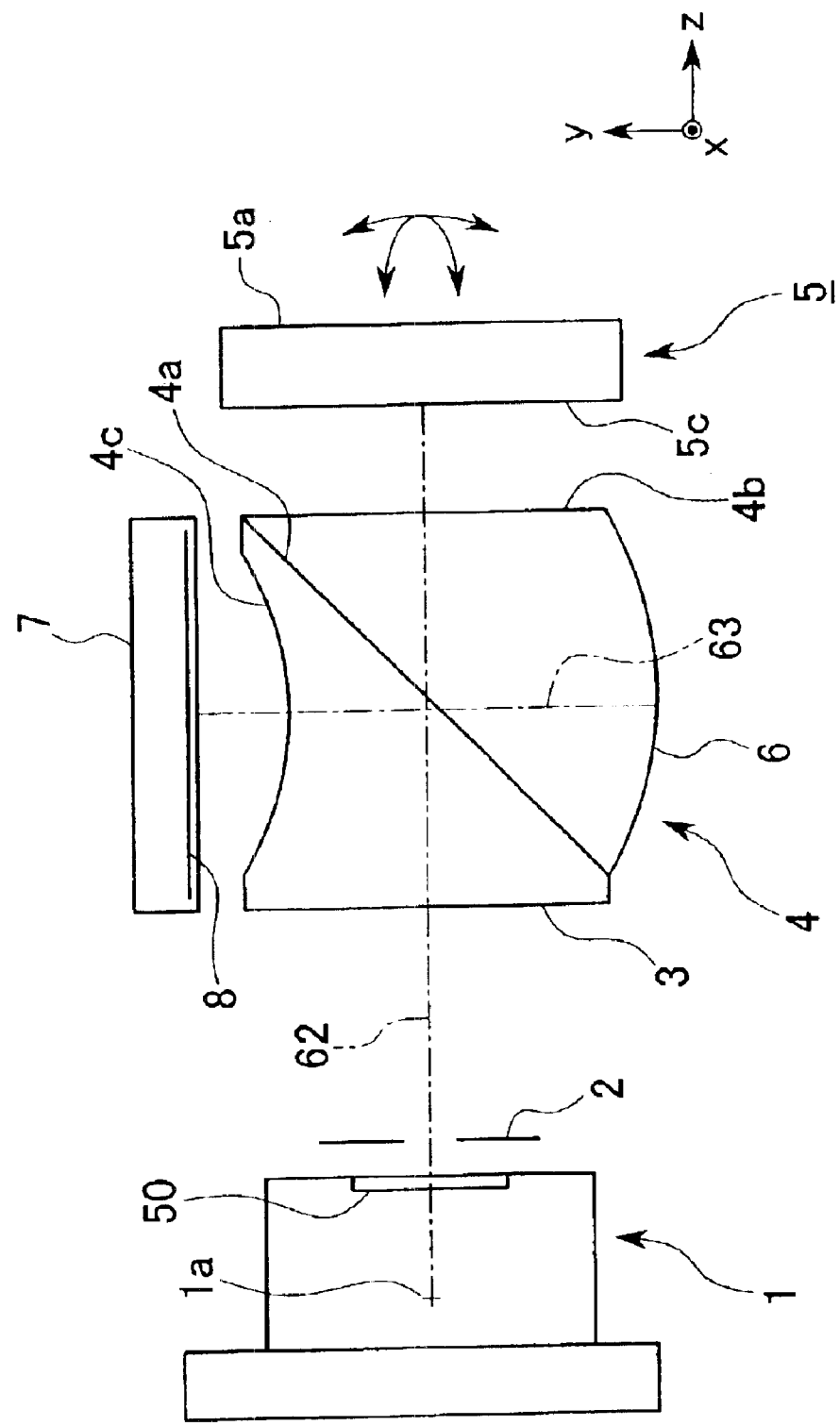
FIG. 3 is a plan view for showing a general structure of an optical system in a deflection angle measuring device according to a first embodiment of the optical signal switching system according to the present invention.

FIG. 3 is a plan view for explaining a general structure of an optical system in the defection angle measuring device 60 according to the present embodiment. An xyz coordinate system in this drawing is the same as that in FIG. 20. Also, an arrow in the drawing indicates a direction of inclination of the rotating mirror 5.

The deflection angle measuring device 60 comprises a light source, a beam splitter which is a prism 4, and a light measuring device 7.

The light source is a semiconductor laser 1 (semiconductor laser element) which emits a laser light flux (light of measurement) toward the reflecting surface 5c of measurement in the rotating mirror 5. Reference numeral 62 indicates a first optical axis which synchronizes with the optical axis of the semiconductor laser 1. The semiconductor laser 1 is disposed so as to face the reflecting surface 5c of measurement such that the optical axis of the semiconductor laser 1 is approximately orthogonal to the reflecting surface 5c of measurement in the rotating mirror 5 at a neutral position of the deflection. Reference numeral 1a indicates a laser emitting point. Reference numeral 50 indicates a cover glass which is contained in the semiconductor laser 1.

An aperture 2 is disposed on the first optical axis 62 so as to regulate the transmission of the laser light flux for forming the shape of the laser light flux in a predetermined shape such as a circle. Here, from an optical point of view, the same condition that the aperture is disposed there can be realized according to a size of the laser light flux; thus, the aperture 2 is not necessarily an absolute requirement.

Also, the prism 4 (beam splitter) in which a beam splitter surface 4a for reflecting and dividing a part of the laser light flux is provided is disposed between the aperture 2 and the reflecting surface 5c of measurement. A light measuring device 7 is disposed so as to face the prism 4 in a direction in which the laser light flux of the first optical axis 62 which is emitted from the semiconductor laser 1 is divided on the beam splitter surface 4a. A light receiving surface 8 of the light measuring device 7 is disposed toward the prism 4.

Hereinafter, an axis which goes along a direction in which the laser light flux on the first optical axis 62 in the present optical system is divided on the beam splitter surface 4a is referred as a second optical axis 63.

It is acceptable that any semiconductor laser be used for the semiconductor laser 1. It is more important that the semiconductor laser having most appropriate wavelength according to a measurement sensitivity of the light measuring device 7 is selected. Although it is not shown in the drawing because any common member can be employed, it is also important the semiconductor laser is connected to a power supply for illuminating the semiconductor laser 1 and a driving device which includes a modulation drive circuit.

The prism 4 is a beam splitter which is formed by attaching raw glass member such as a common glass like S-BSL7 manufactured by Ohara Incorporated or an optical plastics such as amorphous polyolefin. A beam splitting surface 4a which is formed on an attaching surface is coated such that the transmission rate versus reflection ratio of the incident laser light flux on the first optical axis 62 becomes approximately 1:1. There is no limitation for an angle of the beam splitting surface 4a. In the drawing, the beam splitting surface 4a is inclined by 45 degrees with reference to the first optical axis 62. Also, the beam splitting surface 4a is disposed in parallel with the x-axis over an entire length of the prism which extends along in the x-direction shown in the drawing.

An incident surface 3 having a positive power for restricting an expansion of the laser light flux is disposed on a side surface of the prism 4 which faces the semiconductor laser 1. For such incident surface 3 having a positive power, a Fresnel lens is formed in FIG. 3. It is acceptable that a convex surface be employed.

Also, a flat transmitting surface 4b which does not have a power is disposed on a side surface of the prism 4 which faces the reflecting surface 5c of measurement.

An emitting surface 4c having a negative power is disposed on a side surface of the prism 4 which faces to the light measuring device 7. For the emitting surface 4c having a negative power, it is possible to employ a concave surface and a Fresnel lens surface. It is acceptable that the concave surface is aspherical.

Also, a concave surface having an optical axis which synchronizes with the second optical axis 63 is formed on an opposite surface of the side surface of the prism 4. A reflecting layer coating is performed on the convex surface; thus, a concave reflecting surface 6 is formed.

Here, it is preferable that surfaces of the incident surface 3, the flat transmitting surface 4b, and the emitting surface 4c are coated so as to avoid the loss of the light quantity and reduce the flare.

For the light measuring device 7, it is possible to employ a position measuring light receptor (Position Sensitive Detector, more commonly called PSD) which generates an output voltage corresponding to the position of the light intensity center of spots when spots of the laser light flux are emitted on the light receiving surface 8 of the sensor so as to measure the positions of the spots. For the light measuring device 7, a light measuring device which measures a one-dimensional position or two-dimensional position according to which of the one-dimension or two-dimension the inclination direction of the rotating mirror 5 is employed. Also, it is important the light measuring device 7 is provided with a power supply and an appropriate driving device so as to operate properly. Explanations for such aspects are commonly known; thus, detailed explanation thereof is omitted.

Next, an operation of the deflection angle measuring device 60 according to the present embodiment is explained, and a deflection angle measuring method according to the present invention is explained.

Figure 4A:
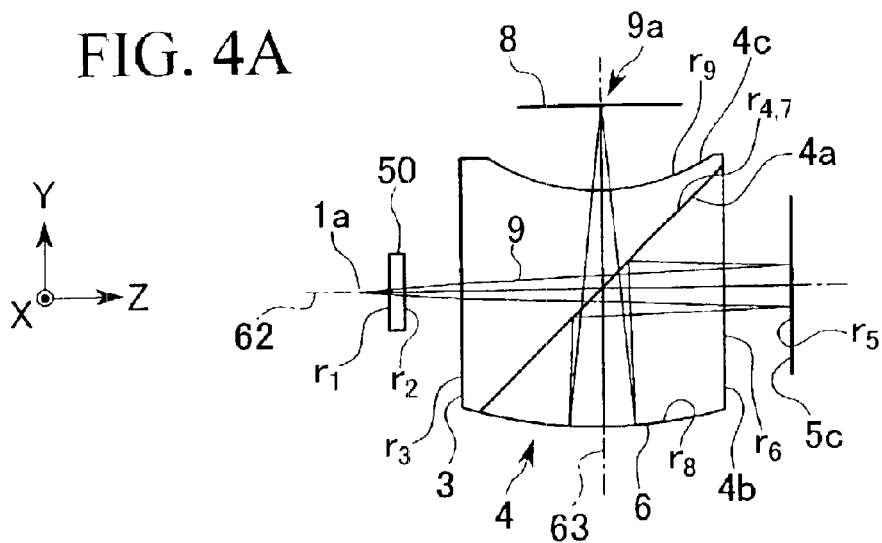
FIGS. 4A to 4C are showing light paths of the optical system in the deflection angle measuring device for explaining data in the first embodiment.
Figure 4B:
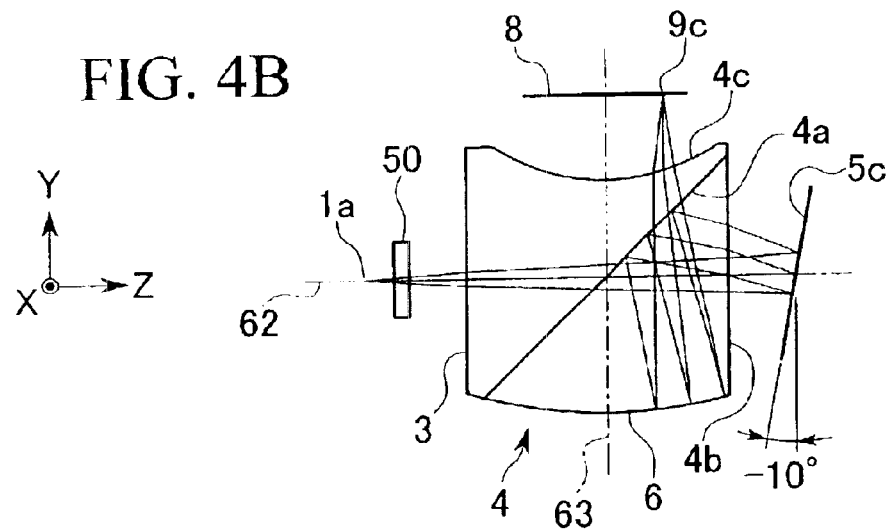
Figure 4C:
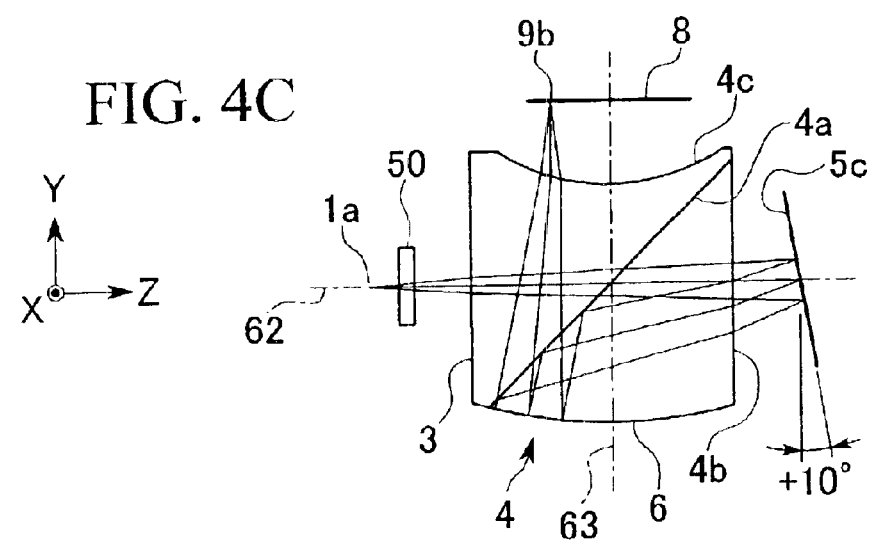

In FIGS. 4A to 4C, light paths which are based on figures shown in a first embodiment which is to be explained later are shown. Various conditions for describing these drawings includes an example of the present embodiment; thus, explanation is made with reference to these drawings. XYZ coordinates is an orthogonal coordinates for describing the light paths. A Z-axis is a light path in the optical system in which the forwarding direction of a light is positive; thus, the Z-axis indicates a light path of an axial main light. An X-axis has a positive direction which is directed to nearside of the drawing from the far side of the drawing; thus, the X-axis is orthogonal to the Z-axis. A Y-axis is obtained by rotating the X-axis by 90 degrees clockwise viewed from the positive direction of the Z-axis.

In FIGS. 4A to 4C, same reference numerals are added as the same members which correspond in FIG. 3. Here, the aperture 2 is omitted, and the laser light flux is shown as a light flux 9. Reference numerals 9a, 9b, and 9c indicate spots which are emitted on a light receiving surface 8 of a sensor.

In FIGS. 4A, 4B, and 4C, light paths having deflection angles such as 0 degree (neutral position), −10 degrees, +10 degrees around the X-axis of the reflecting surface 5c of measurement.

First, a case in which the deflection angle shown in FIG. 4A is 0 degree is explained.

The light flux 9 is emitted from the laser emitting point 1a toward a cover glass 50 on the first optical axis 62 and transmits through the cover glass 50 so as to continue spreading. When the light flux 9 is incident to the incident surface 3 on the prism 4, the light flux 9 is prevented from spreading by a positive power which is provided on the incident surface 3; thus, the light flux 9 passes linearly.

Next, the light flux 9 reaches the beam splitting surface 4a. Approximately 50% of the light flux 9 passes linearly and transmits through the beam splitting surface 4a. The light flux 9 further transmits through the flat transmitting surface 4b and is reflected at the reflecting surface 5c of measurement.

The light flux 9 which is reflected at the reflecting surface 5c of measurement passes reversely so as to reenter to the prism 4 from the flat transmitting surface 4b. When the light flux 9 reaches the beam splitting surface 4a, approximately 50% of the light flux 9 is reflected in a direction which is directed toward a concave reflecting surface 6 on the second optical axis 63. While the light flux 9 is condensed by a positive power on the concave reflecting surface 6, the light flux 9 passes linearly toward the beam splitting surface 4a on the second optical axis 63.

When the light flux 9 reaches the beam splitting surface 4a for the third times, approximately 50% of the light flux 9 transmits therethrough so as to pass linearly. When the light flux 9 reaches the emitting surface 4c, non-axial aberration such as a curvature of field is compensated by a negative power on the emitting surface 4c. Also, simultaneously, a tele-centricity of a field (inclination amount of non-axial main light to the optical axis) is compensated; thus, the light flux 9 is incident approximately orthogonally to a sensor 8 in case of a non-axial light flux. Thus, spots having desirable focusing quality are formed on entire positions on the sensor 8.

In FIGS. 4B and 4C, the optical path changes after the light flux 9 is reflected at the reflecting surface 5c of measurement according to the deflection angle of the reflection surface 5c of measurement. In FIG. 4B, it can be observed that, when the deflection angle is −10 degrees, a spot 9c is focused on a light receiving surface 8 of a sensor. In FIG. 4C, it can be observed that, when the deflection angle is +10 degrees, a spot 9b is focused on a light receiving surface 8 of a sensor.

Here, in above explanation, the reflecting surface 5c of measurement changes its inclination around the X-axis for a convenience for simplifying the explanation. When the reflecting surface 5c of measurement changes its inclination around the Y-axis, essential portion of the explanation is effectively the same as the above explanation while there is only a difference that the optical path of the light flux 9 becomes three-dimensional.

Next, a method for measuring the deflection angle by the spots which are made by focusing the light flux 9 on the light receiving surface 8 of a sensor through the above optical system is explained.

Figure 5:
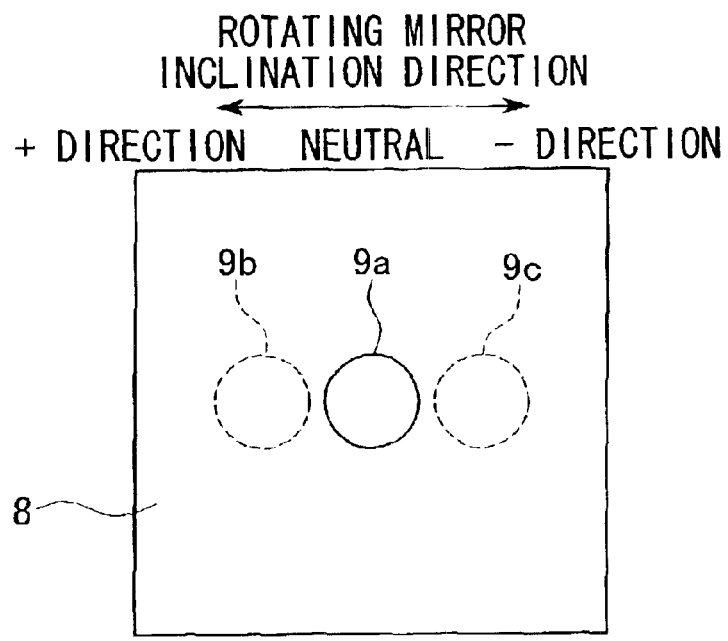
FIG. 5 is a view for showing a focusing spot on a one-dimensional PSD.

In FIG. 5, it can be observed that spots 9a, 9b, and 9c are focused on the light receiving surface 8 of a sensor of the light measuring device 7. Also, FIG. 6 is a graph for explaining a relationship of the deflection angle of the rotating mirror 5 and the output of the light measuring device 7.

In FIG. 5, it is shown that, the spots 9a, 9b and 9c are focused on the light receiving surface 8 of a sensor of the light measuring device 7 made by a one-divisional PSD when the deflection angle of the rotating mirror 5 is changed in a range of −10 to +10 degrees in a one-dimensional direction. According to the drawing, it is shown that the spots 9a, 9b, and 9c are scanned in a one-dimensional direction. Here, the PSD exhibits an output shown in FIG. 6. Here, FIG. 5 is an approximate view for making an explanation; thus, it is not intended to limit the usage of the spots 9a, 9b, and 9c in a case in which the light intensity distribution is circular.

Figure 6:
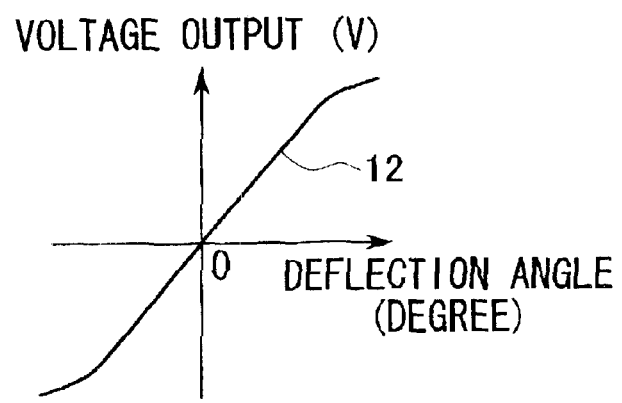
FIG. 6 is a graph for showing a relationship between a deflection angle at a rotating mirror and an output by a light measuring device.

In FIG. 6, a horizontal axis indicates a deflection angle of the reflecting surface 5c of measurement which reflects the light flux 9. Here, unit is indicated by degrees. The reflecting surface 5c of measurement and the deflection mirror surface 5a operate cooperatively; thus, the deflection angle corresponds to the deflection angle of the rotating mirror 5. Also, a vertical axis indicates a voltage output of the light measuring device 7 according to the deflection angle which is indicated by a unit of volt (V).

In an response curve 12, a typical pattern of the change in the voltage output is shown under condition that the deflection angle is changed. The light measuring device 7 is adjusted so as to perform an offset-adjustment such that the voltage output becomes 0 volt according to 0 degree (neutral position) of the deflection angle; thus, the response curve becomes a curve which is approximately symmetric by a reference point. In addition, the deflection angle and the voltage output are proportional when an absolute value of the deflection angle is small; thus, the response curve becomes a linear line. The deflection angle and the voltage output are not proportional when an absolute value of the deflection angle is large; thus, the response curve becomes a curve. A linear part of the response curve 12 indicates an area in which the most preferable position measuring accuracy can be realized.

As explained above, by using the PSD, it is possible to realize an analogue voltage output which correspond to the position of the spot. Therefore, it is possible to measure the deflection angle in a high resolution and obtain a high speed response. Also, the system has a simple structure, thus, the system becomes more reliable. Also, it is possible to obtain an analogue voltage output; thus, it is possible to put out the analogue voltage output directly or convert the analogue voltage output preferably so as to put out the measurement level signal 203. Thus, it is possible to input the measurement level signal 203 into the deflection angle controlling device 61 and realize a feedback control easily by using the measurement level signal 203.

Here, the curved section in the response curve 12 is caused by a deterioration of the sensitivity to a periphery by a sensor of the optical measuring device 7, curvature of field in the optical system, deformation of a spot diameter due to aberration such as distortion, and a change in the incident angle of the light flux 9 to the light receiving surface 8 of a sensor. Therefore, by stabilizing these factors such as the spot diameter, light amount distribution, and scanning operability, it is possible to broaden an position measuring range and perform accurate position measurement in a wide range.

Figure 7:
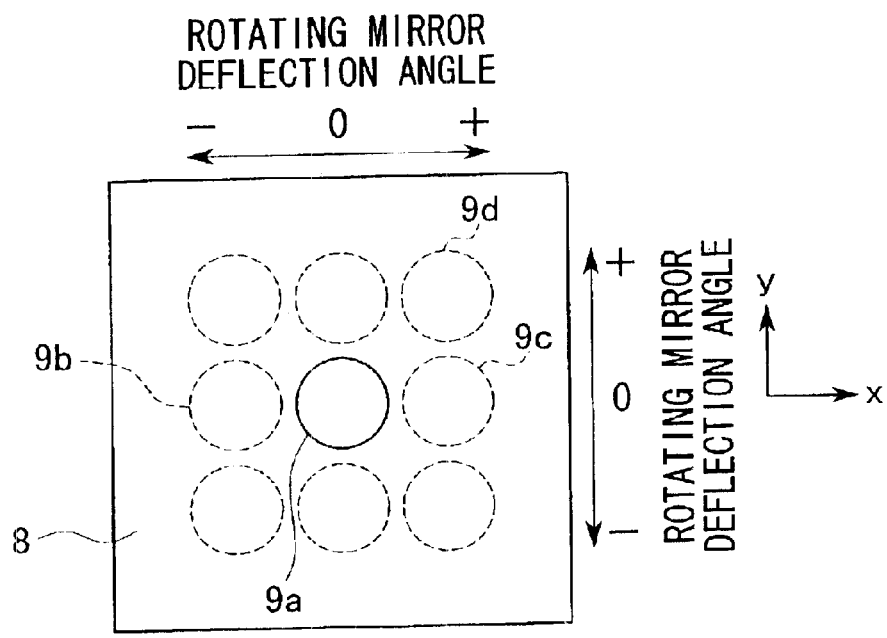
FIG. 7 is a view for showing a focusing spot on a two-dimensional PSD.

As explained above, the rotating mirror 5 is inclined in a one-dimensional direction. In a two-dimensional PSD, the voltage output is divided into two directional components; thus, it is possible to say that the same thing happens to each of the divided directional component as the above case. In FIG. 7, a two-dimensional PSD is employed and a principle for measuring the position of spot in a plane in the xy direction.

In FIG. 7, xy direction indicates directions of the voltage output which is generated by the two-dimensional PSD on the light receiving surface 8 of a sensor. For example, the spots 9b, 9a, and 9c indicate the position of the spot when the deflection angle in the inclination direction of a rotating mirror 5 is 0 (zero) degree and the deflection angle in the inclination direction of the other rotating mirror 5 is changed from a minus angle to a plus angle. Also, a spot 9d indicates a position of the spot an inclination in a two-dimensional direction in which each deflection angle is a plus angle occurs.

Also, when a desirable position measurement is performed by using the PSD, it is necessary that the spot diameter which is emitted on the light receiving surface 8 of a sensor should be an appropriate size according to the sensitivity if the PSD.

Here, the PSD measures the light amount distribution center of the spot; therefore, it is not necessary that the spot diameter should by accurate enough to be used in an optical recording operation. For example, sufficient measurement accuracy can be realized by obtaining a desirable spot diameter by shifting the light receiving surface 8 of a sensor to a defocus region from the best focus image surface in the optical design.

Therefore, when the deflection angle measuring device 60 is attached to various devices having different measuring range, it is not necessary to design an optical system independently: That is, it is possible to deal with the various devices by changing the attaching position of the light receiving surface 8 of a sensor in a focus depth direction and further exchanging the light measuring device 7 having a different measurement sensitivity.

Figure 8:
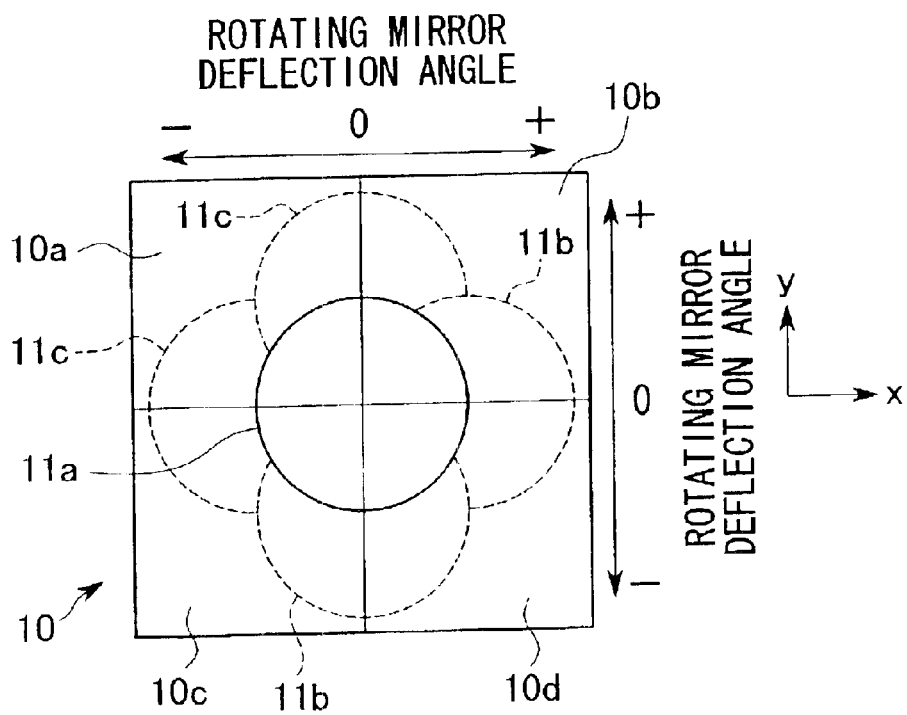
FIG. 8 is a view for showing a focusing spot in a PD which is divided in four portions.

Here, in the present invention, it is possible to employ a four-division light receptor (four-division PD) shown in FIG. 8 as a light measuring device 7 which can measure the position in two-dimension. In FIG. 8, reference numeral 10 indicates a sensor light receiving surface which is disposed on the four-division light receptor. Reference numerals 11a, 11b, 11c, and 11d indicates spots which are emitted on the sensor light receiving surface 10 according to the deflection angle of the reflecting surface 5c of measurement. In order to perform the position measurement in two-dimension by the four-division PD, it is necessary that the spots move under condition that the spots are emitted more than three light receiving surfaces.

The sensor light receiving surface 10 is divided into four light receiving surfaces 10a, 10b, 10c, and 10d which put out the voltage according to the light receiving amount independently. When the position measurement direction are in x direction and y direction as shown in the drawing, the light receiving surfaces 10a and 10b are disposed so as to be next each other in the x direction. Also, the light receiving surfaces 10c and 10d are disposed so as to be next each other. Also, in the y direction, the light receiving surfaces 10a and 10c are disposed so as to be next each other. Also, the light receiving surfaces 10b and 10d are disposed so as to be next each other.

Next, a principle of position measurement by the four-division PD is explained. Outputs of the light receiving surfaces 10a, 10b, 10c, and 10d are A, B, C, and D when the spot is emitted on the sensor light receiving surface 10 respectively. In such a case, an output which corresponds to a position in the x direction can be obtained by calculating a formula of (A+D−B−C)/(A+B+C+D). An output which corresponds to a position in the y direction can be obtained by calculating a formula of (A+B−C−d)/(A+B+C+D). These outputs can be obtained in a form of preferable linear response as long as the spot form is uniform.

As explained above, there are advantages as follows according to the deflection angle measuring device 60 according to the first embodiment. First, by disposing the concave reflecting surface 6 having a positive power, it is possible to return the light flux 9 which is reflected by the beam splitting surface 4a after the light flux 9 is reflected at the reflecting surface 5c of measurement so as to introduce to the light receiving surface 8 of a sensor. By doing this, it is possible to return the optical path. Furthermore, as is understood from FIGS. 4B and 4C, the concave reflecting surface 6 has a function for condensing the light flux 9 which deviates from the second optical axis 63 in an optical axis of the concave reflecting surface 6 when the deflection angle changes. Therefore, it is possible to focus the light flux in relatively a small area with an appropriate spot diameter even if the length of the optical path is long; thus, the light receiving surface 8 of a sensor can be compact. Also, by using a concave reflecting surface 6, there is an advantage in that it is possible to make the optical system more compact than the conventional optical system even if the measurement range of the deflection angle is set wide.

Second, when only the condensing lens 71 having a positive power is disposed between the deflecting beam splitter 73 and the reflecting surface 70c of measurement as shown in the conventional technique shown in FIG. 20, an aperture 76 must be small so as to make the spot diameter of the laser flux small; thus, there is a large light amount loss. However, in the deflection angle measuring device 60 according to the present embodiment, the incident surface 3 which is disposed near the laser emitting point 1a has a positive power. Therefore, the light flux 9 is restricted so as not to spread while the spot diameter of the laser flux as a spreading light is small. Therefore, the aperture 2 becomes unnecessary, or it is possible to reduce the loss of the light amount even if the aperture 2 is necessary. Also, it is possible to design the optical system in which the spot 9a (9b, 9c) on the light receiving surface 8 of a sensor can be maintained in an appropriate size even if the length of the optical path is relatively long. As a result, it is possible to obtain a light of measurement having large S/N ratio while restricting the light amount loss in the light flux 9. Simultaneously, there is an advantage in that it is possible to enhance the measurement accuracy of the light measuring device 7 by making the length of the optical path relatively longer.

Third, an emitting surface 4c having a negative power is provided in front of the light receiving surface 8 of a sensor. Therefore, by using the negative power, it is possible to reduce the curvature of field which increases on the optical surface having a positive power such as an incident surface 3 and the concave reflecting surface 6. Also, it is quite effective to compensating the inclination of the non-axial main light after emitted from the emitting surface 4c and non-axial aberration such as distortion. Therefore, there is an advantage in that it is possible to reduce unevenness in the spot diameter on the light receiving surface 8 of a sensor due to the height of the image and the scanning distortion in the spot so as to enhance the measurement accuracy of the light measuring device 7.

Fourth, by combining and changing the power of the optical surface in different positions such as an incident surface 3, a concave reflecting surface 6, or an emitting surface 4c and variety of curvature, it is possible to compensate the aberration in an entire optical system flexibly. Therefore, there are advantages in that it is possible to optimize the power distribution in the optical surfaces and to arrange rational shape of each optical surface.

Furthermore, when a surface having a power is made by a Fresnel lens, it is possible to make the optical system by eliminating the convex surface from the prism 4.

Also, when a surface having a power is made by an aspherical surface, it is possible to design an optical system for enhancing the effect for compensating the aberration in an optical surface. Therefore, it is possible to enhance the focusing quality and simplify the optical surface.

Furthermore, by forming the incident surface 3, the emitting surface 4c, and the concave reflecting surface 6 on a side surface of the prism 4, there is an advantage that the members of the optical system can be reduced.

Here, it is preferable that the incident surface 3 has a positive power. If the positive power in the concave reflecting surface 6 is sufficient enough for a required optical quality, the incident surface 3 is not necessary.

Also, in the above explanation, the deflection mirror surface 5a and the reflecting surface 5c of measurement are separate members. However, it is acceptable that reflecting surfaces are formed on a front surface and a back surface of the mirror member.

Next, a second embodiment of the optical signal switching system according to the present invention is explained. This embodiment is different from the first embodiment only with respect to a structure of the deflection angle measuring device 60. Here, only the detail of the deflection angle measuring device 60 is explained; thus, the other structure is not explained.

Figure 9A:
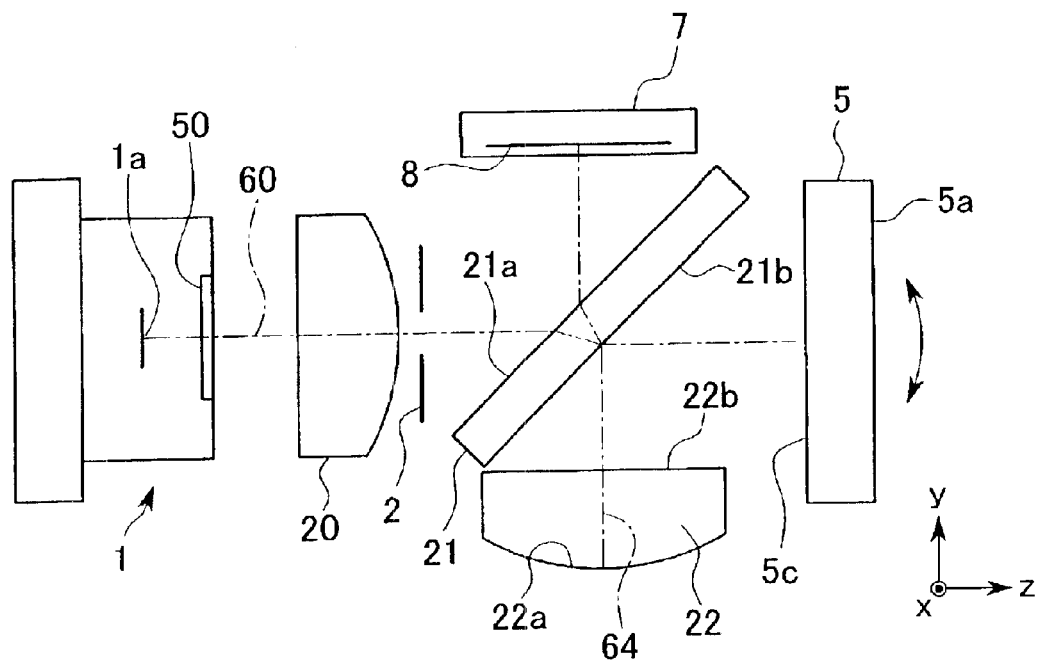
FIGS. 9A and 9B are plan views for showing a general structure of an optical system in a deflection angle measuring device according to a second embodiment of the optical signal switching system according to the present invention.
Figure 9B:
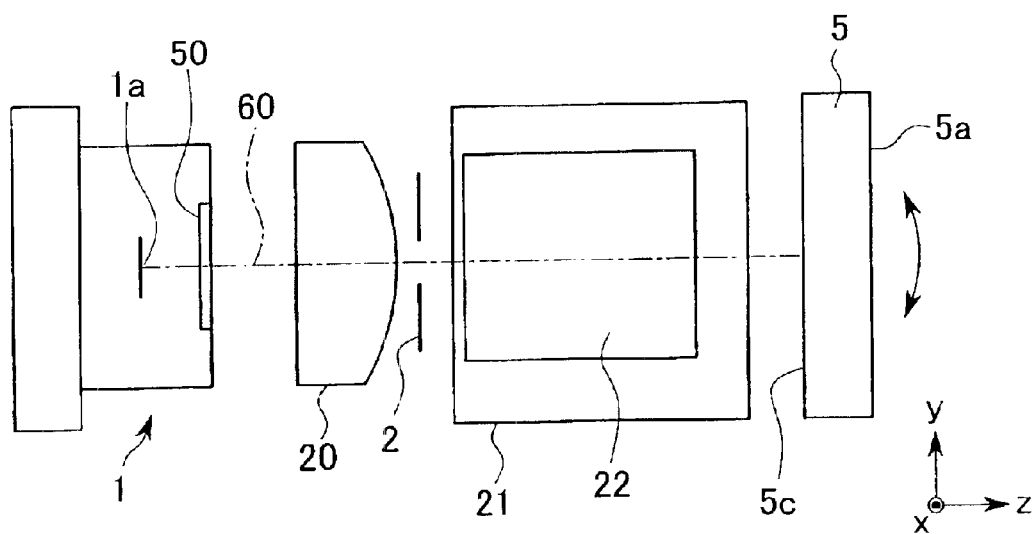

FIG. 9A is a plan view for showing a general structure of the deflection angle measuring device 60 according to the present embodiment. FIG. 9B is also a plan view. An xyz coordinates system is the same as that shown in FIG. 20. Also, an arrow shown in the drawing indicates a direction in which the rotating mirror 5 is inclined.

The deflection angle measuring device 60 according to the present embodiment is formed by arranging each optical surface provided on the prism 4 according to the first embodiment by different members. That is, the deflection angle measuring device 60 according to the present embodiment is provided with a semiconductor laser 1, a condensing lens 20, a flat plate 21, a concave surface reflecting element 22 having a back reflecting surface, and a light measuring device 7.

The semiconductor laser 1 is a light source which emits a laser light flux (light of measurement) toward a reflecting surface 5c of measurement in the rotating mirror 5. Reference numeral 62 indicates a first optical axis which synchronizes the optical axis of the semiconductor laser 1. The optical axis of the semiconductor laser 1 is disposed so as to be approximately orthogonal to the reflecting surface 5c of measurement in the rotating mirror 5 which is located in a neutral position of the deflection. Reference numeral 1a indicates a laser emitting point. Reference numeral 50 indicates a cover glass which is contained in the semiconductor laser 1.

The light condensing lens 20 has a positive power. The light condensing lens 20 is disposed on the first optical axis 62 so as to face the semiconductor laser 1. In the drawing, it is shown that the light condensing lens 20 has a plano-convex shape. Any lens is acceptable having a positive power. That is, a common glass such as S-BSL7 manufactured by Ohara Incorporated or an optical plastics such as amorphous poly-olefin can be used for a glass member. Although, an aperture 2 is disposed in a positive direction of the z axis direction of the light condensing lens 20, such a structure is not necessarily an absolute requirement in the present invention due to the same reason as explained in the first embodiment.

A flat plate 21 (parallel flat plate) is disposed between the light condensing lens 20 and the reflecting surface 5c of measurement. The flat plate 21 is a beam splitter on which a surface coating layer for reflecting and dividing a part of the laser light flux is formed. The base member of the flat plate 21 is a parallel flat plate made from a glass member such as S-BSL7 which is manufactured by Ohara Incorporated, a glass member such as a white board, or a plastic member such as ZEONEX manufactured by ZEON Corporation. Also, a beam splitting surface 21b which is coated such that the transmitting ration is 50% and the reflecting ratio is 50% on a surface of the flat plate 21. The angle of the beams splitting surface 21b is not limited. In FIG. 9A, the beam splitting surface 21b is inclined by 45 degrees against the first optical axis 62.

A light measuring device 7 is disposed such that the light receiving surface 8 of a sensor faces to the flat plate 21 in a direction in which the laser light flux which is emitted from the semiconductor laser 1 on the first optical axis 62. A concave surface reflecting element 22 is disposed at far side to the light measuring device 7 so as to sandwiching the flat plate 21.

A reflecting layer coating is performed on a concave reflecting surface 22a in the plano-convex lens having a flat transmitting surface 22b and a concave reflecting surface 22a in the concave reflecting element 22. The concave surface reflecting element 22 is an optical element so as to be a back surface mirror having a concave surface viewed from a flat transmitting surface 22b. The flat surface transmitting surface 22b maintains an appropriate interval with the flat plate 21. The concave reflecting surface 22a is disposed so as to face toward the flat plate 21. An optical axis of the concave reflecting surface 22a synchronizes the third optical axis 64 under condition that the third optical axis 64 is an axis long a direction in which the laser light flux on the first optical axis 62 in the present optical system is divided by the beam splitting surface 21b.

An operation in the deflection angle measuring device 60 according to the present embodiment having the above structure is explained as follows. In FIG. 10, an optical axes based on the structures shown in FIGS. 9A and 9B are shown.

In FIG. 10, the same reference numerals are added to an optical surface which correspond to the structures in FIGS. 9A and 9B. Here, an aperture 2 is omitted. Also, the laser light flux is shown as a light flux 9. Reference numerals 9a, 9b, and 9c indicate spots which are emitted on the light receiving surface 8 of a sensor.

Figure 10A:
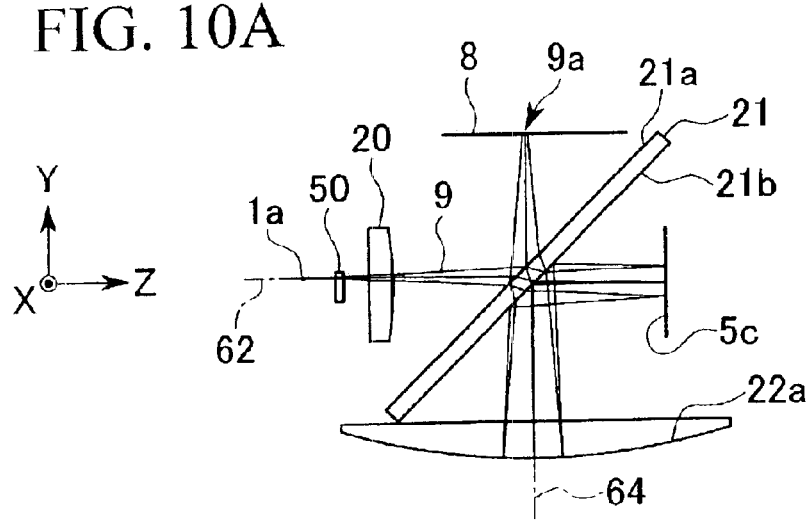
FIGS. 10A to 10C are view showing optical paths in the deflection angle measuring device in the second embodiment of the present invention.
Figure 10B:
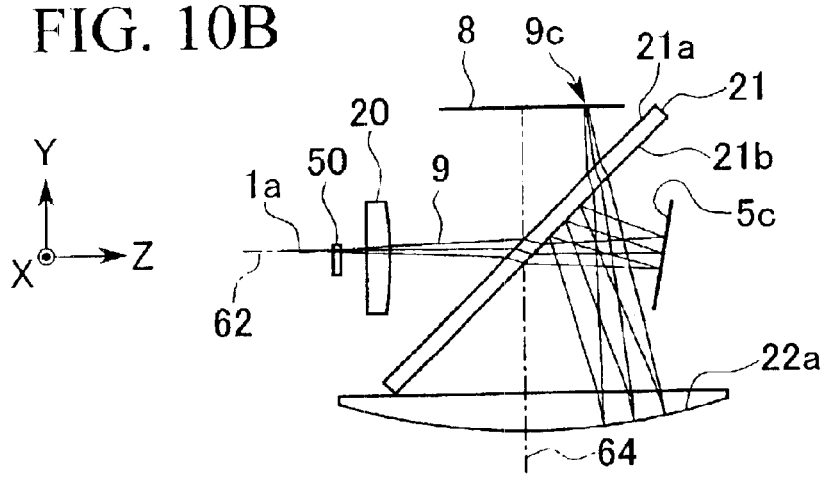
Figure 10C:
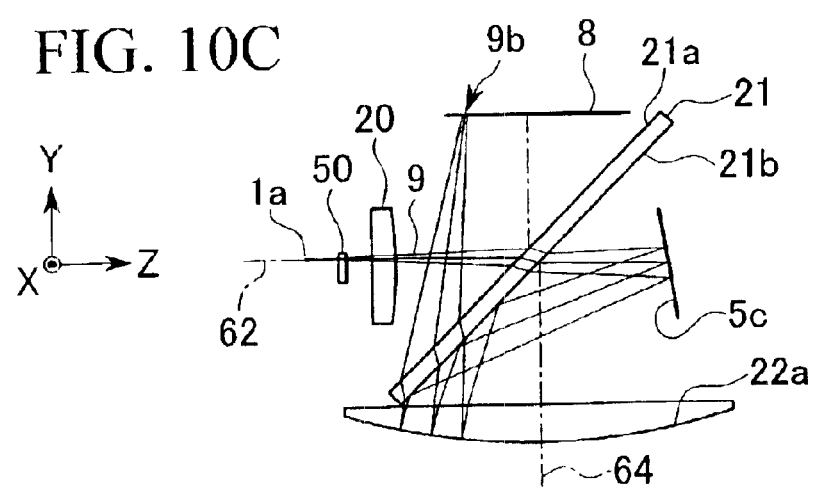

In FIGS. 10A, 10B, and 10C, light paths having deflection angles such as 0 degree (neutral position), −10 degrees, +10 degrees around the X-axis of the reflecting surface 5c of measurement.

First, a case in which the deflection angle shown in FIG. 10A is 0 degree is explained.

The light flux 9 is emitted from the laser emitting point 1a on the first optical axis 62 and transmits through the cover glass 50. When the light flux 9 is incident to the light condensing lens 20, the light flux 9 is prevented from spreading by a positive power which is provided on the light condensing lens 20; thus, the light flux 9 passes linearly.

Next, the light flux 9 reaches the flat plate 21. Approximately 50% of the light flux 9 passes through the beam splitting surface 21b. The light flux 9 further passes linearly according to the thickness of the flat plate 21 while deviating its axis in a negative direction in Y direction. The light flux 9 is reflected at the reflecting surface 5c of measurement.

The light flux 9 which is reflected at the reflecting surface 5c of measurement passes reversely so as reach the beam splitting surface 21b. Approximately 50% of the light flux 9 is reflected in a direction which is directed toward a concave reflecting surface 22a on the third optical axis 64. While the light flux 9 is reflected and condensed by a positive power on the concave reflecting surface 22a, the light flux 9 passes linearly toward the flat plate 21 on the third optical axis 64.

When the light flux 9 reaches the flat plate 21 for the third times, approximately 50% of the light flux 9 transmits therethrough so as to be focused on the light receiving surface 8 of a sensor so form the spot 9a.

In FIGS. 10B and 10C, the optical axis changes when the light flux 9 is reflected at the reflecting surface 5c of measurement according to the deflection angle at the reflecting surface 5c of measurement. In FIG. 10B, it can be observed that, when the deflection angle is −10 degrees, a spot 9c is focused on a light receiving surface 8 of a sensor in a positive direction of the z direction. In FIG. 10C, it can be observed that, when the deflection angle is +10 degrees, a spot 9b is focused on a light receiving surface 8 of a sensor in a negative direction in the z direction.

Here, in above explanation, the reflecting surface 5c of measurement changes its inclination around the X-axis for a convenience for simplifying the explanation. When the reflecting surface 5c of measurement changes its inclination around the Y-axis, essential portion of the explanation is effectively the same as the above explanation while there is only a difference that the optical path of the light flux 9 becomes three-dimensional.

According to the above structure, the spot 9a (9b, 9c) is focused on the light receiving surface 8 of a sensor so as to correspond to the deflection angle similarly to the deflection angle measuring device 60 according to the first embodiment. Therefore, it is possible to measure the deflection angle by the deflection angle measuring device 7 similarly to the first embodiment.

In the optical system in the deflection angle measuring device 60 according to the present embodiment as explained above, the concave reflecting surface 6 in the first embodiment corresponds to the concave reflecting surface 22a. The incident surface 3 corresponds approximately to the light condensing lens 20. The beam splitting surface 4a corresponds to the flat plate 21. By doing this, it is possible to obtain the same effects as those obtained in the first embodiment.

Furthermore, for a particular effect by the deflection angle measuring device 60 according to the second embodiment, there is an effect in that the manufacturing cost can be reduced because it is possible to produce a beam splitter by a flat plate 21.

Here, in the present embodiment, there is a space around the flat plate 21. Therefore, it is acceptable that a lens having a negative power be disposed between the flat plate 21 and the light receiving surface 8 of a sensor. In such a case, the flat plate 21 is an optical element which corresponds to an emitting surface 4c in the first embodiment; therefore, it is possible to realize the same effect as that of the emitting surface 4c.

Also, it is acceptable that a lens having a positive power be disposed between the flat plate 21 and the reflecting surface 5c of measurement. By doing this, the light flux 9 transmits through the light condensing lens twice; therefore, there is an effect in that the power of the lens can be doubled. As a result, it is possible to design the optical system easily because it is possible to deregulate the restriction in the distribution of the positive power in the light condensing lens 20 and the concave reflecting surface 22a. Thus, there is an advantage in that it is possible to reduce the manufacturing cost greatly. Here, in this case, the light condensing spot becomes small on the reflecting surface 5c of measurement, there is a possibility in that the optical system be affected by a bad reflection due to a dust on the reflecting surface 5c of measurement. Therefore, it is very important to give an optical power so as to make a spot have a sufficient size to a dust in order not to affect the deflection angle measuring accuracy.

Here, in the above explanation, the concave surface reflecting element 22 has a structure of a back surface reflecting mirror; thus, the power of the concave reflecting surface 22a increases by a refractive index of the glass member for the concave surface reflecting element 22. By doing this, it is possible to form the concave surface reflecting element 22 by relatively a large radius of curvature; thus it is possible to form it easily. Also, there is an effect in that it is possible to form a large reflecting surface; thus, it is possible to reduce the influence by a dust on the surface thereof.

It is acceptable that a concave surface is disposed on the glass member appropriately so as to obtain a surface reflecting concave surface mirror on which a reflection layer coating is performed. In such a case, optical characteristics such as a refractive index of the glass member for forming the concave surface is not a problem. Therefore, there is an effect in that it is possible to use a cheap glass member.

Next, a third embodiment of the optical signal switching system according to the present invention is explained as follows. In the present embodiment, only the deflection angle measuring device 60 is different from that in the first embodiment. Therefore, explanations for other member are omitted; thus, the embodiment of the deflection angle measuring device 60 is explained in detail.

Figure 11:
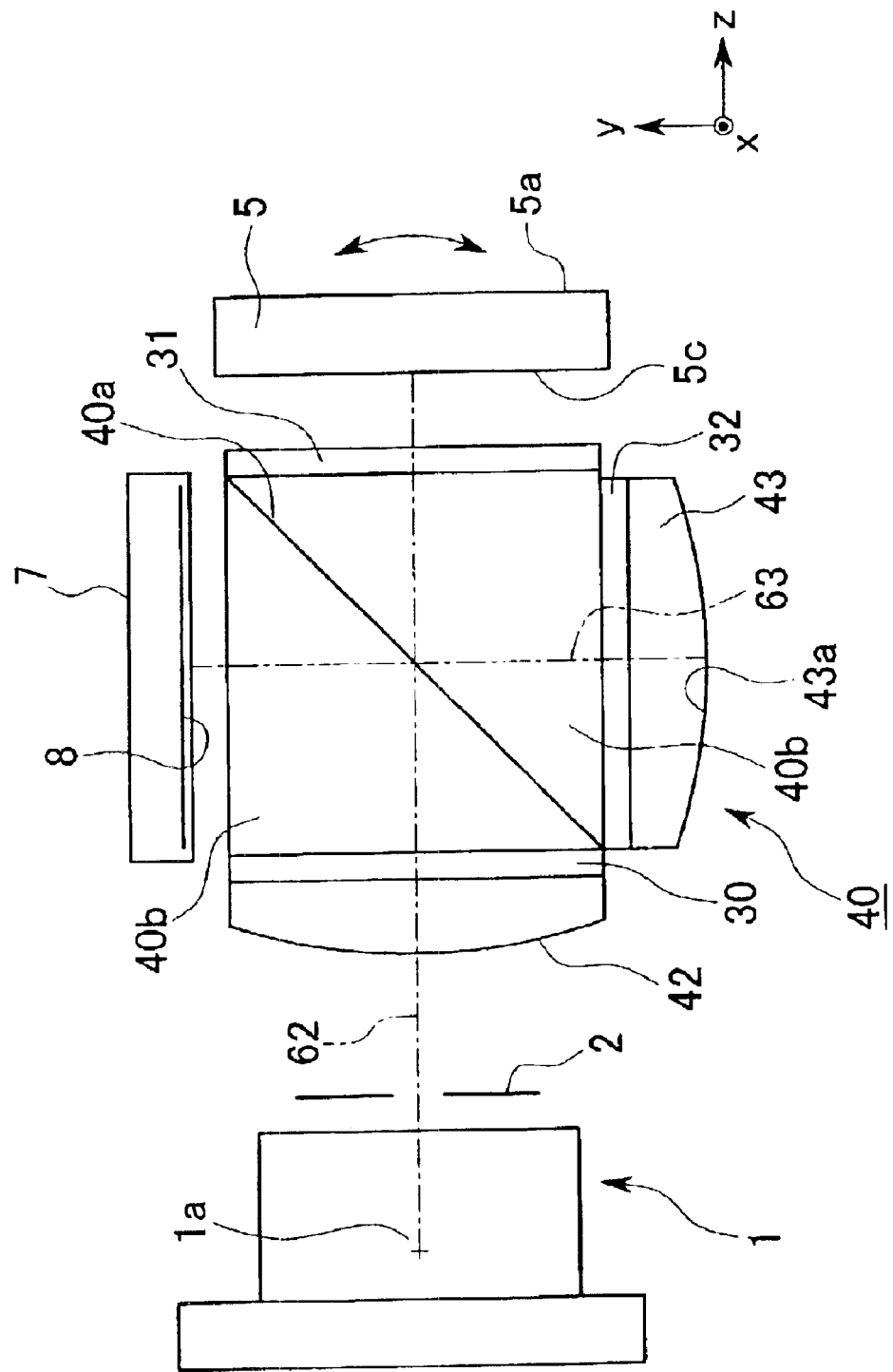
FIG. 11 is a plan view for showing a general structure of an optical system in a deflection angle measuring device according to a third embodiment of the optical signal switching system according to the present invention.

FIG. 11 is a plan view for explaining a general structure of the optical system in the deflection angle measuring device 60 according to the present embodiment. The xyz coordinates system shown in the drawing is equivalent to that in FIG. 20. Also, an arrow in the drawing indicates an inclination direction of the rotating mirror 5.

In the deflection angle measuring device 60 according to the present embodiment, a polarizing beam splitter 40 is employed instead of the prism 4 in the first embodiment. The polarizing beam splitter 40 is formed by disposing a polarizing beam splitting surface 40a for changing an optical path according to a polarization component on a diagonal line on a prism 40b having a prismatic shape and attaching an optical element which is explained as follows on a side surface of the prism 40b.

A polarizing plate 30 (polarizing element) which transmits only a P-polarization component in the laser light flux is attached on a side surface of the prism 40b which is directed toward the semiconductor laser 1. From thereon, a light condensing lens 42 containing a plano-convex lens is attached. A first ¼ wavelength plate 31 is attached on a side surface of the prism 40 which is directed toward the reflecting surface 5c of measurement. Also, a second ¼ wavelength plate 32 is attached on a side surface of the prism 40b which is opposite to the light measuring device 7. A convex surface reflecting element 43 is attached further thereon.

A polarizing beam splitting coating is formed on the polarizing beam splitting surface 40a such that the transmitting ratio of the P-polarization component of the laser light flux on the first optical axis 62 is approximately 100% and the reflecting ratio is 0%, and the transmitting ratio of the S-polarization component is approximately 0% and the reflecting ratio is 100%.

A concave surface reflecting element 43 is a back surface reflecting mirror by forming a reflection layer coating on the convex surface of the plano-convex lens so as to concave surface reflection surface 43a.

Here, for a glass member for an optical element such as a prism 43, a light condensing lens 42, and a concave surface reflecting element 43, a common glass such as S-BSL7 manufactured by Ohara Incorporated and an optical plastics such as amorphous poly-olefin can be used. However, the present embodiment employs a polarization characteristics; therefore, a focusing position shifts because the refractive index in the glass member is large and the optical path is distorted. As a result, there is a possibility in that the measurement accuracy of the deflection angle is deteriorated. Therefore, it is preferable to use the glass member which has low refractive index characteristics. Therefore, there is no problem in a common optical glass. However, it is preferable to use a plastic member which is made by an injection molding operation having a low refractive index characteristics. Otherwise, it is preferable that the injection distortion be eliminated by an appropriate means.

An operation of the deflection angle measuring device 60 according to the present embodiment having above structure is explained by following its optical path. Here, the drawing for the optical path not shown because the optical path is approximately the same as that shown in FIGS. 4A to 4C. Here, explanation is made for an optical path having 0 (zero) degree for a deflection angle at the reflecting surface 5c of measurement. In the drawing, an aperture 2 is shown, although, it is acceptable if the aperture 2 is not disposed.

The laser light flux which is emitted from the semiconductor laser 1 passes the first optical axis 62 linearly and is incident to the light condensing lens 42. The laser light flux passes linearly without spreading due to a positive power on the light condensing lens 42.

Next, the laser light flux transmits through the polarizing plate 30; thus, the lase light flux becomes a linear polarization having only P-polarization component so as to be incident to the prism 40b. When the laser light flux reaches the polarizing beam splitting surface 40a, the polarizing beam splitting surface 40a transmits approximately 100% of the P-polarization component therethrough; therefore, there is no light amount loss. Subsequently, the laser light flux reaches the ¼ wavelength plate 31. The linear polarization having P-polarization component is converted to a circular polarization by the first ¼ wavelength plate 31 and passes linearly so as to be reflected by the reflecting surface 5c of measurement.

The laser light flux passes the first optical axis 62 reversely and goes linearly so as to be incident to the first ¼ wavelength plate 31 again. Subsequently, the laser light flux having a circular polarization is converted to a linear polarization having only S-polarization component of which phase is shifted by 90 degrees to a light which is incident to the mirror by the first ¼ wavelength plate 31 so as to pass in the prism 40b linearly.

When the laser light flux having only S-polarization component reaches the polarizing beam splitting surface 40a, approximately 100% of the S-polarization component is reflected. Therefore, the laser light flux passes linearly toward the concave reflecting surface 22a on the second optical axis 63 and transmits through the second ¼ wavelength plate 32.

Subsequently, the laser light flux having S-polarization component is converted to a circular polarization by the second ¼ wavelength plate 32 so as to pass through the concave surface reflecting element 22 and reflected at the concave reflecting surface 22a. The laser light flux is condensed by a positive power on the concave reflecting surface 22a and passes reversely on the second optical axis 63 to be incident to the second ¼ wavelength plate 32 again.

Subsequently, the laser light flux having a circular polarization is converted to a linear polarization having only P-polarization component by the second ¼ wavelength plate 32 and reaches the polarizing beam splitting surface 40*a*. Approximately 100% of the linear polarization having only P-polarization component transmits through the polarizing beam splitting surface 40*a* and passes on the second optical axis 63 linearly. By doing this, the laser light flux as a linear polarization having only P-polarization component is emitted from the prism 40*b* so as to be focused on the light receiving surface 8 of a sensor.

As explained above, in the present embodiment, after the laser light flux passes through the polarizing plate 30, the light amount loss does not occur due to the transmission and the reflection in the polarizing beam splitting surface 40*a*, the first ¼ wavelength plate 31, the second ¼ wavelength plate 32.

By doing this, it is possible to form an optical system in which the optical path is returned in compact manner as similar to the first embodiment. In addition, it is possible to form an optical system in which there is very few light amount loss with regardless of the reflection in the returned light and the transmission; thus, there is an advantage in that it is possible to use a cheap, small output semiconductor laser.

Also, there is almost not light amount loss after the reflection at the reflecting surface 5*c* of measurement; thus, there is an advantage in that it is possible use a light for measuring the deflection angle having high S/N ration; therefore, it is possible to improve the measurement accuracy.

Here, in the above structure, the polarizing plate 30 is disposed between the light condensing lens 42 and the prism 40*b*, although, it is acceptable that the polarizing plate 30 be disposed between the semiconductor laser 1 and the light condensing lens 42. Also, it is not necessarily an absolute requirement to attach the polarizing plate 30, the light condensing lens 42, the concave surface reflecting element 43, the first ¼ wavelength plate 31, the second ¼ wavelength plate 32 to the prism 40*b*. It is acceptable to attach them by another appropriate method.

As explained above, the deflection angle measuring device 60 according to the present embodiment is characterized in reducing the light amount loss by using the polarizing beam splitter 40. For that purpose, it is required that the polarization in the middle of the optical path such as the first ¼ wavelength plate 31, and the second ¼ wavelength plate 32 be converted.

In the above example, the transmitting light other than the P-polarization component is cut by the polarizing plate 30; therefore, the S-polarization component of the light which is incident to the polarizing beam splitter 40 is lost. Therefore, it is possible to cut the S-polarization component as a stray light which deviated from the above optical path; thus, it is possible to improve the measurement accuracy. On the other hand, the S-polarization component may cause a light amount loss. In such a case, it is possible to reduce the light amount loss caused by the polarizing plate 30 by disposing the semiconductor laser 1 in an appropriate direction by making use of a common characteristics such that the semiconductor laser 1 is polarized in a direction toward an activated layer.

Furthermore, some of the semiconductor layer laser has an optical characteristics which is quite close to the linear polarization. By using such a semiconductor laser, there is an effect in that it is possible to reduce the light amount loss without using the polarizing plate 30 and eliminate the stray light.

Also, it is preferable that the light condensing lens 42 is made by a Fresnel lens so as to make the polarizing beam splitter 40 small.

In the above structure, explanation was made for a case in which it is possible to make a small size device and simplify the assembly procedure by attaching the optical elements. Also, it is acceptable that the optical element is disposed in a designated position instead of being attached.

Also, it is effective to dispose another polarizing plate just before the light flux 9 is incident to the light measuring device 7 for reducing the stray light. That is, the reflecting ratio and the transmitting ratio at the polarizing plate for the polarization component does not become 100% actually; therefore, it sometimes occur that the light other than a light on the regular optical axis is introduced to the light measuring device 7. Thus, disposing a polarizing plate which has the same polarizing characteristics (transmitting characteristics, reflecting characteristics) as that in the incident polarizing plate 30 just before the light flux is incident to the light measuring device 7 is effective for eliminating the stray light and improving the measurement accuracy.

Next, a fourth embodiment of the optical signal switching system according to the present invention is explained with reference to FIG. 12. The present embodiment is different from the first embodiment only with respect to the deflection angle measuring device 60. Hereafter, an embodiment of the deflection angle measuring device 60 is explained in detail and the explanation for the other member is omitted.

Figure 12:
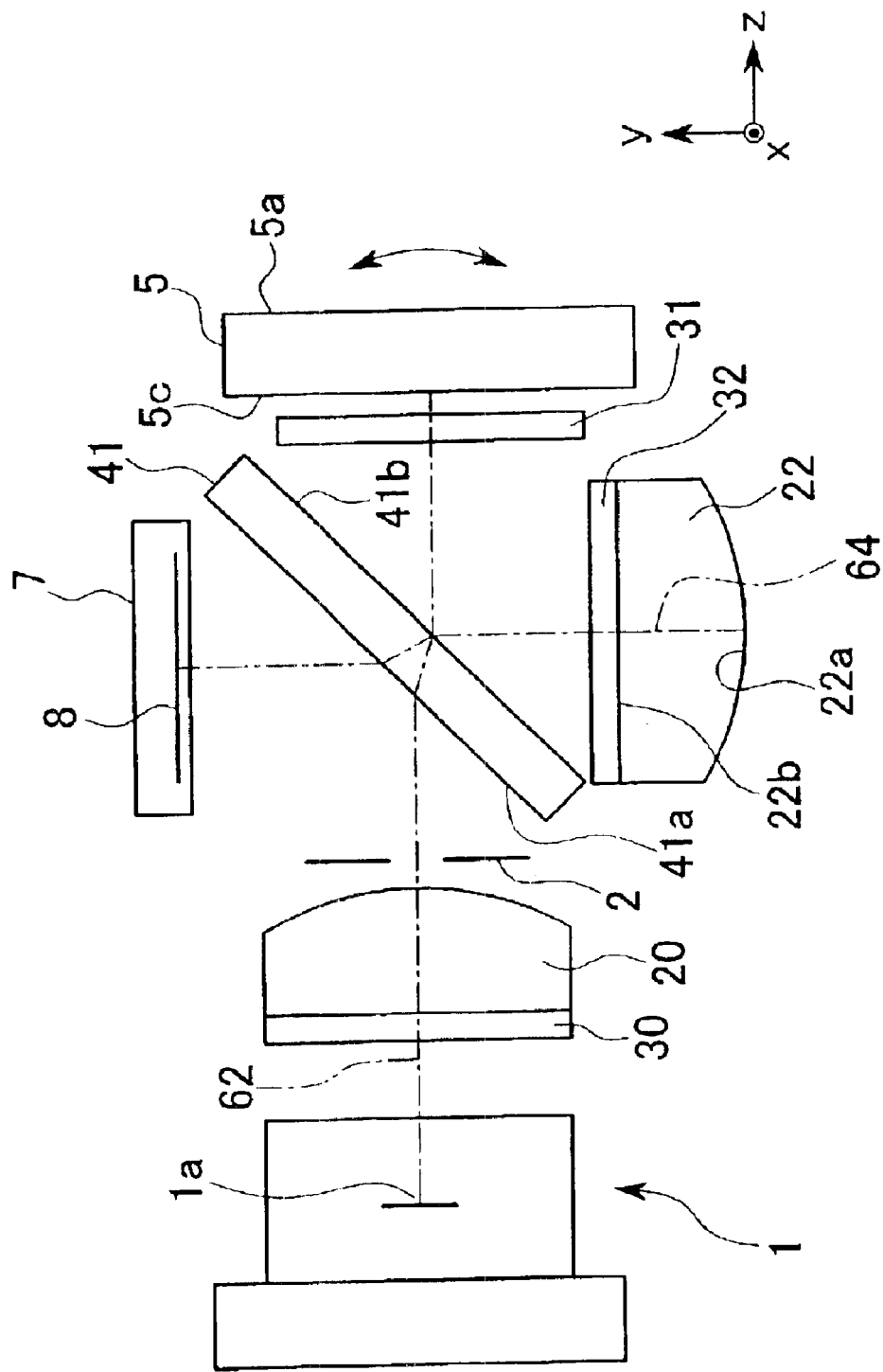
FIG. 12 is a plan view for showing a general structure of an optical system in a deflection angle measuring device according to a fourth embodiment of the optical signal switching system according to the present invention.

FIG. 12 is a plan view for explaining a general structure of the deflection angle measuring device 60 according to the present embodiment. The xyz coordinates system shown in the drawing is equivalent to that in FIG. 20. Also, an arrow in the drawing indicates an inclination direction of the rotating mirror 5.

The deflection angle measuring device 60 according to the present embodiment reduces the light amount loss by using a deflecting beam splitter or the like. The deflection angle measuring device 60 is provided with a plurality of the same optical elements as those in the deflection angle measuring device according to the second embodiment. In the present embodiment, the flat plate 21 is replaced by a polarizing beam splitting plate 41. The polarizing plate 30 is disposed on the light condensing lens 20 in a near side to the semiconductor laser 1. A first ¼ wavelength plate 31 is disposed between the polarizing beam splitting plate 41 and the reflecting surface 5*c* of measurement. A second ¼ wavelength plate 32 is disposed between the concave surface reflecting element 22 and the polarizing beam splitting plate 41.

The base member of the polarizing beam splitting plate 41 is a flat plate made of a glass member such as S-BSL7 which is manufactured by Ohara Incorporated, a glass such as a white board, or a plastic member such as XEONEX which is manufactured by ZEON Corporation. A polarizing beam splitting coating for changing the optical axis according to the polarization component is formed on the polarizing beam splitting surface 41*b* such that the transmitting ratio of the P-polarization component of the laser light flux on the first optical axis 62 is approximately 100% and the reflecting ratio is 0%, and the transmitting ratio of the S-polarization component is approximately 0% and the reflecting ratio is 100%.

Next, an operation of the deflection angle measuring device 60 according to the present embodiment having above structure is explained by following its optical path. Here, the drawing for the optical path not shown because the optical path is approximately the same as that shown in FIGS. 10A and 10B. Here, explanation is made for an optical path having 0 (zero) degree for a deflection angle at the reflecting surface 5c of measurement. In the drawing, an aperture 2 is shown, although, it is acceptable if the aperture 2 is not disposed.

The laser light flux which is emitted from the semiconductor laser 1 passes the first optical axis 62 linearly and transmits through the polarizing plate 30 so as to become a linear polarization having only S-polarization component. The linear polarization having only S-polarization component is incident to the light condensing lens 20. The laser light flux passes linearly without spreading due to a positive power on the light condensing lens 20.

Next, the laser light flux is incident to the polarizing beam splitting plate 41. When the laser light flux is incident to the polarizing beam splitting surface 41b, the polarizing beam splitting surface 41b approximately 100% of the P-polarization component. Therefore, the light flux transmits linearly without light amount loss. Subsequently, the laser light flux reaches the ¼ wavelength plate 31. The linear polarization having P-polarization component is converted to a circular polarization and is reflected by the reflecting surface 5c of measurement.

The laser light flux passes the first optical axis 62 reversely and goes linearly so as to be incident to the first ¼ wavelength plate 31 again. Subsequently, the laser light flux having a circular polarization is converted to a linear polarization having only S-polarization component of which phase is shifted by 90 degrees to a light which is incident to the mirror by the first ¼ wavelength plate 31 so as to pass in the polarizing beam splitting plate 41 linearly.

Approximately 100% of the laser light flux having only S-polarization component is reflected at the polarizing beam splitting surface 41b. The laser light flux passes linearly toward the concave reflecting surface 22a on the third optical axis 64 and transmits through the second ¼ wavelength plate 32.

Subsequently, the laser light flux having S-polarization component is converted to a circular polarization by the second ¼ wavelength plate 32 so as to be reflected at the concave reflecting surface 22a. The laser light flux is condensed by a positive power on the concave reflecting surface 22a so to be incident to the second ¼ wavelength plate 32 again.

Subsequently, the laser light flux having a circular polarization is converted to a linear polarization having only P-polarization component by the second ¼ wavelength plate 32. Approximately 100% of the linear polarization having only P-polarization component transmits through the polarizing beam splitting surface 40a. Approximately 100% of the linear polarization having only P-polarization component is emitted from the prism 40b so as to be focused on the light receiving surface 8 of a sensor.

As explained above, in the present embodiment of the deflection angle measuring device 60, it is possible to realize the same effect as that in the second embodiment.

Next, a fifth embodiment of the optical signal switching system according to the present invention is explained. The present embodiment is different from the first embodiment only with respect to the deflection angle measuring device 60. Hereafter, an embodiment of the deflection angle measuring device 60 is explained in detail and the explanation for the other member is omitted.

Figure 13:
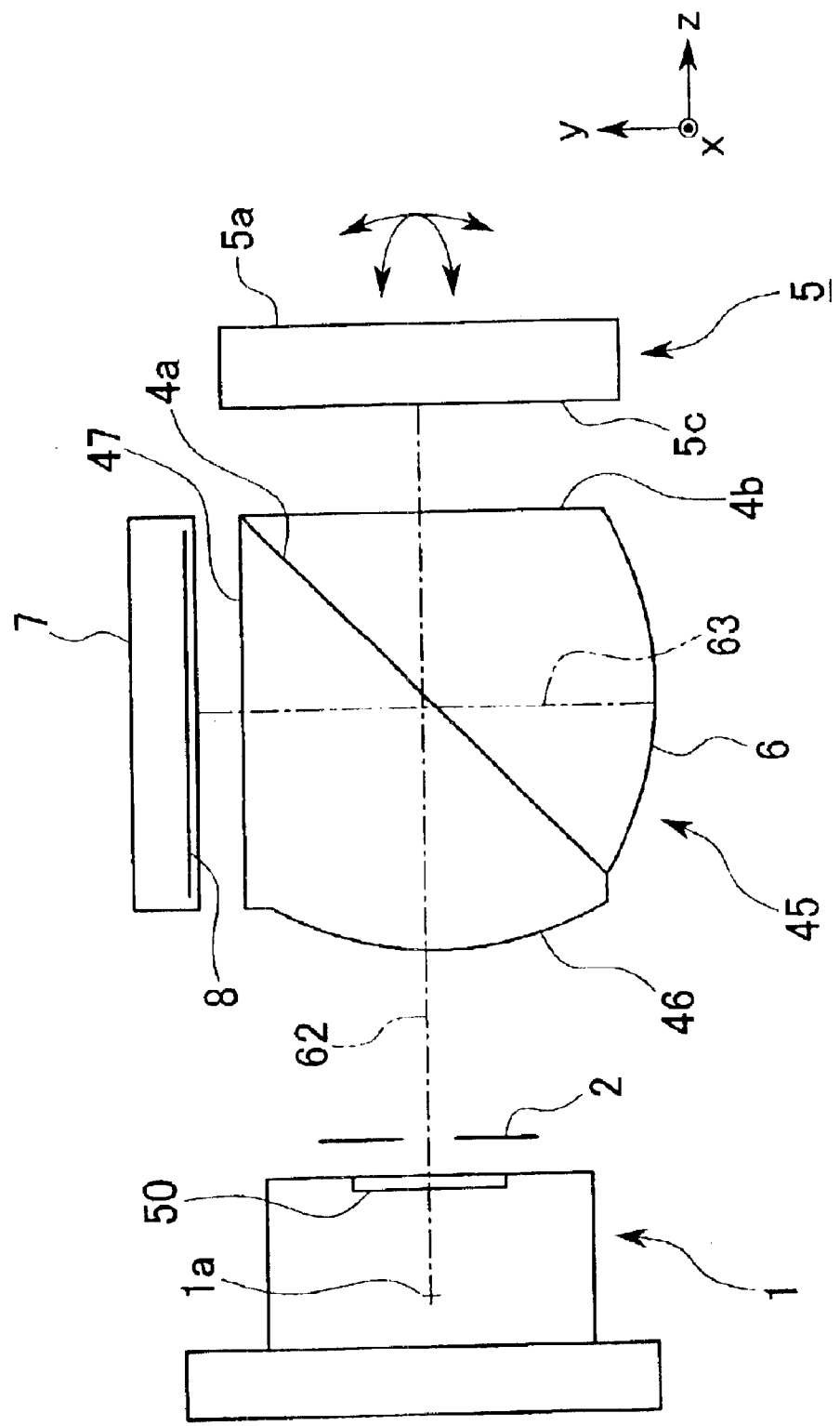
FIG. 13 is a plan view for showing a general structure of an optical system in a deflection angle measuring device according to a fifth embodiment of the optical signal switching system according to the present invention.

FIG. 13 is a plan view for explaining a general structure of the deflection angle measuring device 60 according to the present embodiment. The xyz coordinates system shown in the drawing is equivalent to that in FIG. 20. Also, an arrow in the drawing indicates an inclination direction of the rotating mirror 5.

In the deflection angle measuring device 60 according to the present embodiment, the prism 4 in the first embodiment is replaced by a prism 45 having a different optical surface structure. The prism 45 is provided with a beam splitting surface 4a, a concave reflecting surface 6, a flat transmitting surface 4b similarly to the prism 4. An incident surface 46 having a convex surface is formed on a side surface of the prism 45 facing toward the semiconductor laser 1. A flat transmitting surface 47 is formed on a side surface of the prism 45 facing toward the light measuring device 7. The convex surface may be aspherical or non-aspherical. Aspherical surface can be formed by grinding operation. The aspherical surface made in a plastic member can be formed by a resin molding operation. Explanation for the optical path is omitted because the incident surface 3 and the emitting surface 4c in the first embodiment can be regarded as an incident surface 46 and a flat transmitting surface 47 respectively.

Here, the incident surface 46 has the same characteristics as that in the incident surface 3 in the first embodiment because the incident surface 46 is provided with a positive power by the convex surface. On the other hand, the flat transmitting surface 47 does not have the same characteristics as that in the emitting surface 4c in the first embodiment because the flat transmitting surface 47 is not provided with a positive power.

Therefore, the present embodiment has the same characteristics as that in the first embodiment except the function in the emitting surface 4c having a negative power in the first embodiment.

In the present invention, the light source is not limited to a laser light. For example, the light source can be an LED illuminating element or various other light sources.

Figure 14:
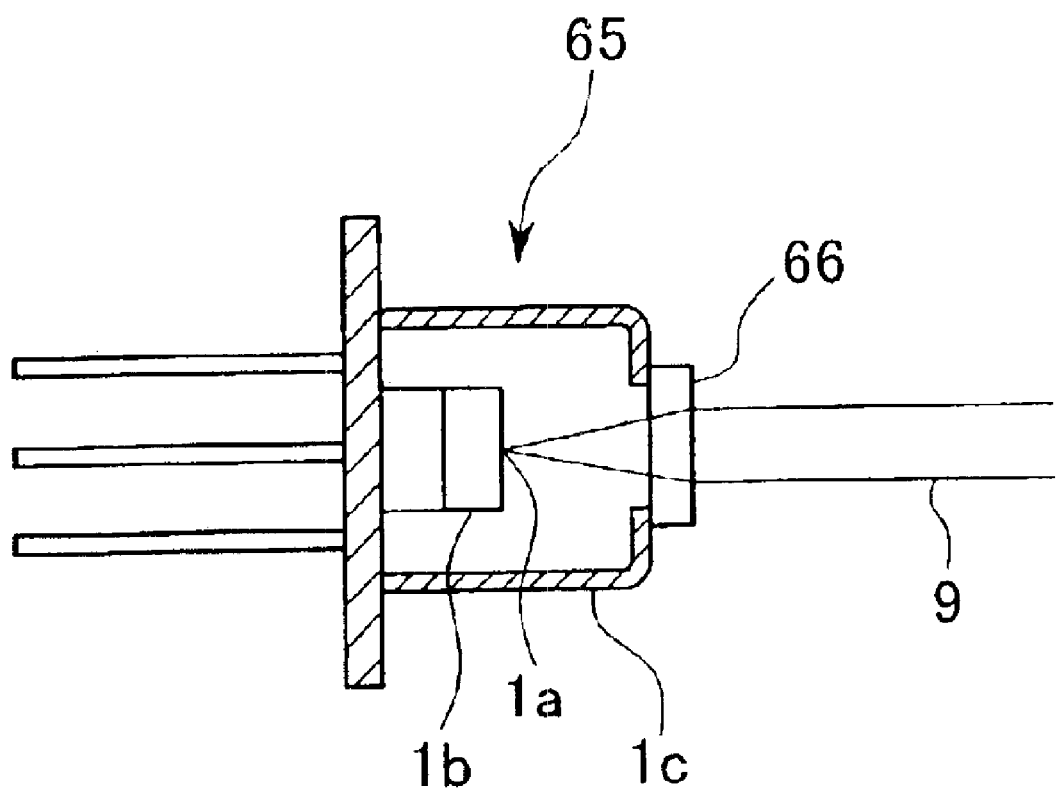
FIG. 14 is a cross section for showing a modified example of a light source in the deflection angle measuring device according to the present invention.

Also, in explanation for the deflection angle measuring device 60 according to the first to fifth embodiments, an incident surface 3, a light condensing lenses 20 and 40 are disposed for optical surfaces having a positive power so as to restrict the spreading of the semiconductor laser 1. However, it is acceptable to use a semiconductor laser 65 in which a light condensing lens 66 formed by a lens, a Fresnel lens, or a hologram element is fixed to an emitting mouth of a package 1c of the semiconductor laser element as shown in FIG. 14. In such a structure, it is possible to omit a cover glass 50.

EXAMPLE 1

Next, actually-designed first example numerals which can be used for a deflection angle measuring device 60 according to the first embodiment are explained with reference to FIG. 4. FIGS. 4A, 4B, and 4C shows optical paths in parameters which form an optical system shown as follows. Here, a wavelength of the light source is set at 785 nm. Explanation for coordinates system and reference numerals is omitted because these are already explained above. An $r_i$ (i is an integer) which is added in FIGS. 4A, 4B, and 4C corresponds to $r_i$ as a parameter forming an optical system shown as follows. A laser emitting point 1a is a physical surface. A light receiving surface 8 of sensor is an image surface.

Parameters forming the optical system is shown in the first numerical example as follows. Here, "$\alpha, \beta, \gamma$" shown in "eccentricity" are angles picked up in counter-clockwise manner around centers of X-axis, Y-axis, and Z-axis viewed from the positive direction of these axes. A unit of length is (mm). A unit of angle is in degree. For example, a deflection angle of the reflecting surface 5c of measurement is indicated by an eccentricity amount of a surface number 5. In this case, it is indicated that the deflection angle is 0 (zero) degree, that is, in a neutral position in both α axis and β axis. Also, the refractive index is indicated with respect to a line d (wavelength 587.56 nm). Also, aspherical surface has a rotational symmetric aspherical shape. Such an aspherical surface can be indicated by a following formula such as "$Z=(y^2/R)/[1+\{1-(1+k)y^2/R^2\}^{1/2}]+ay^4+by^6+cy^8+dy^{10}+\ldots$".

Here, R is a paraxial curvature of radius. K is a conical constant a, b, c, ds are a four-dimensional aspherical function, a fifth-dimensional aspherical function, a sixth-dimensional aspherical function, and an eighth-dimensional aspherical function, and a tenth-dimensional aspherical function, respectively.

The z-axis in this formula becomes an axis for the rotational symmetrical aspherical surface.

Here, if data is not shown in a parameter regarding aspherical shape, it is understood that a value is 0 (zero).

| Surface No. | Radius of Curvature | Surface Interval | Eccentricity | Refractive Index | Abbe's Number |
|---|---|---|---|---|---|
| Physical Surface | | ∞ | 0.50 | | |
| 1 | $(r_1 =)$ | ∞ | 0.25 | $(n_1 =)$ 1.5163 | $(\nu_1 =)$64.1 |
| 2 | $(r_2 =)$ | ∞ | 1.00 | | |
| 3 | $(r_3 =)$ | Fresnel Surface [1] | 4.50 | $(n_3 =)$ 1.5254 | $(\nu_3 =)$56.2 |
| 4 | $(r_4 =)$ | ∞ | 1.20 | | |
| 5 | $(r_5 =)$ | Mirror Surface | −1.20 | Eccentricity [1] | |
| 6 | $(r_6 =)$ | ∞ | −2.10 | $(n_6 =)$ | $(\nu_6 =)$56.2 |
| 7 | $(r_7 =)$ | ∞(HM surface | 2.40 | Eccentricity [2] $(n_7 =)$ | 1.5254 | $(\nu_7 =)$56.2 |
| 8 | $(r_8 =)$ | (Concave reflecting surface | −4.10 | $(n_8 =)$ | 1.5254 | $(\nu_8 =)$56.2 |
| 9 | $(r_9 =)$ | Aspherical Surface [1] | −1.49 | | |
| Image Surface | | ∞ | 0.00 | | |

| Fresnel Surface [1] | |
|---|---|
| Radius of Curvature | 2.93 |
| k | 0.0000 |
| a | $5.5752 \times 10^{-1}$ |

| Aspherical Surface [1] | |
|---|---|
| Radius of Curvature | −4.34 |
| k | −1.0000 |
| a | $-1.2413 \times 10^{-2}$ |

| Eccentricity [1] | | | | | |
|---|---|---|---|---|---|
| X | 0.00 | Y | 0.00 | Z | 0.00 |
| α | 0.00 | β | 0.00 | γ | 0.00 |

| Eccentricity [2] | | | | | |
|---|---|---|---|---|---|
| X | 0.00 | Y | 0.00 | Z | 0.00 |
| α | −45.00 | β | 0.00 | γ | 0.00 |

As understood from the above result, an incident surface 3 on the prism 4 is a Fresnel lens surface (surface number 3) having a positive power. A concave surface reflective surface 6 is disposed for a back surface reflecting surface (surface number 8). An aspherical surface (surface number 9) having a negative power is disposed on an emitting surface 4c. By doing this, it is possible to design an optical system having a desirable compensation ability for chromatic difference of magnification when the deflection angle is 0 (zero) degree and +10 degrees. The present embodiment is under condition of an axial symmetric optical system; therefore, it is possible to understand that the chromatic difference of magnification with the deflection angle of =10 degrees becomes the same as that of the above case.

As understood from the above surface interval, in the present embodiment, it is possible to realize a prism 4 which is compact enough to be contained in a rectangular cross section of approximately 4.5 mm×4.1 mm. Also, a distance from the laser emitting point 1a to the reflecting surface 5c of measurement is 7.45 mm, and a distance from an end of the concave reflecting surface 6 to a light receiving surface 8 of a sensor is 5.59 mm.

EXAMPLE 2

Figure 17A:
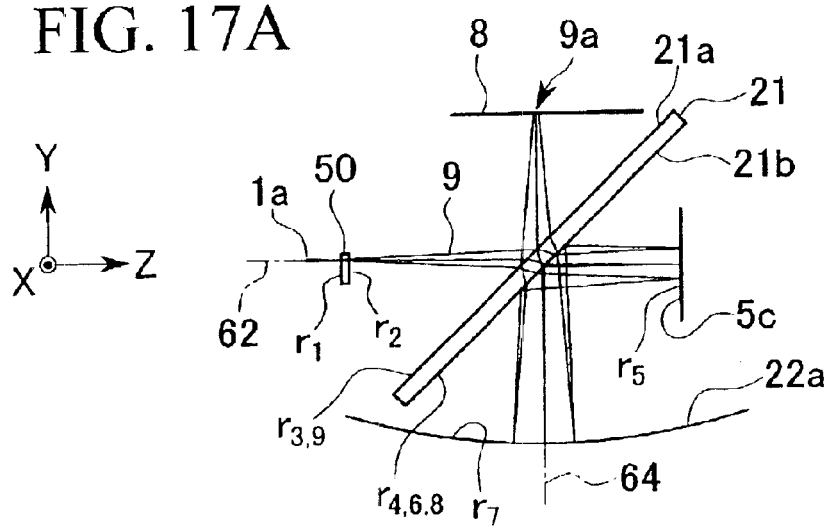
FIGS. 17A to 17C are showing light paths of the optical system in the deflection angle measuring device for explaining data in the second embodiment.
Figure 17B:
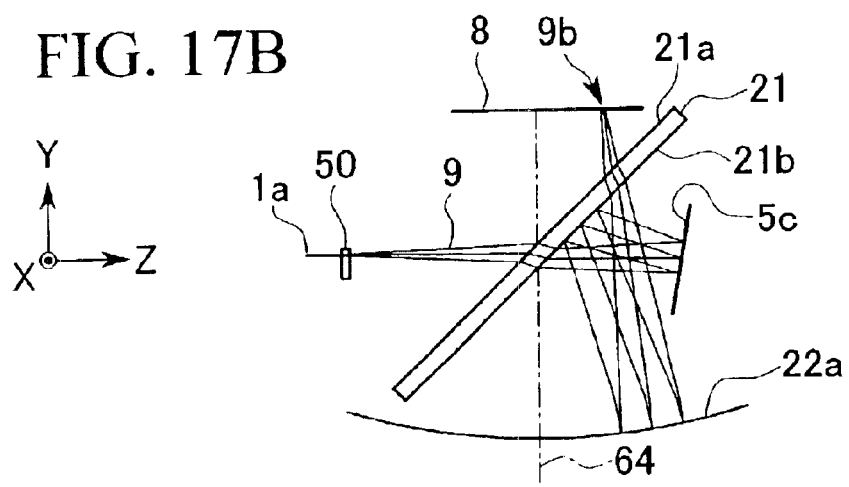
Figure 17C:
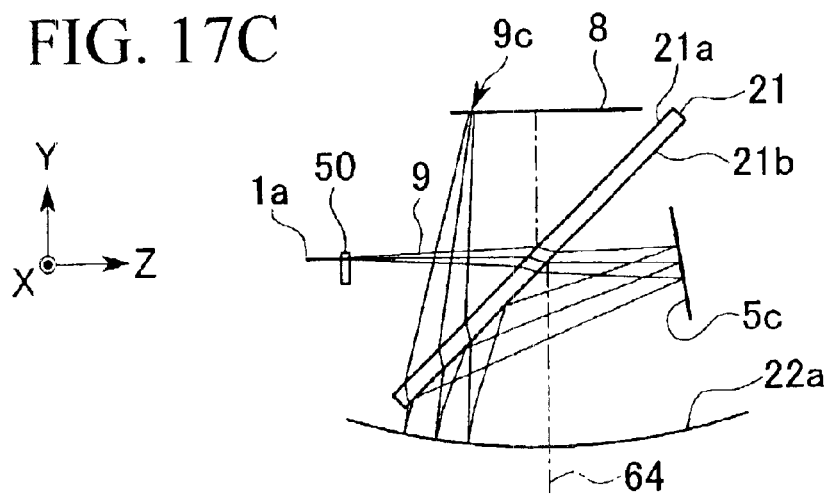

Next, actually-designed second example numerals which can be used for a deflection angle measuring device 60 according to the second embodiment are explained with reference to FIGS. 17A to 17C. FIGS. 17A to 17C are different from FIG. 10 in that a light condensing lens 20 is omitted.

In FIGS. 17A, 17B, and 17C, a light path which is indicated by parameters for an optical system as follows. Here, explanation is omitted with respect to a wavelength of a light source, what "$r_i$" is defined as, coordinates system, unit, refractive index, a formula for defining an aspherical surface, because those are described previously.

| Surface No. | Radius of Curvature | | Surface Interval | Eccentricity | Refractive Index | Abbe's Number |
|---|---|---|---|---|---|---|
| Physical Surface | | | ∞ | 0.50 | | |
| 1 | ($r_1$ =) | | ∞ | 0.25 | ($n_1$ =) 1.5163 | ($\nu_1$ =)64.1 |
| 2 | ($r_2$ =) | | ∞ | 5.50 | | |
| 3 | ($r_3$ =) | | ∞ | 0.80 | Eccentricity [3] ($n_3$ =) | 1.5163 ($\nu_3$ =)64.1 |
| 4 | ($r_4$ =) | | ∞ | 4.30 | Eccentricity [3] | |
| 5 | ($r_5$ =) | | Mirror Surface | −4.30 | Eccentricity [4] | |
| 6 | ($r_6$ =) | | ∞(HM Surface) | −5.30 | Eccentricity [3] ($n_6$ =) | |
| 7 | ($r_7$ =) | | Asperical Surface [2] (Concave reflecting surface) | −5.30 | | |
| 8 | ($r_8$ =) | | ∞ | −0.80 | Eccentricity [5] ($n_8$ =) | 1.5163 ($\nu_8$ =)64.1 |
| 9 | ($r_9$ =) | | ∞ | −5.49 | Eccentricity [5] | |
| Image Surface | | | ∞ | 0.00 | Eccentricity [6] | |

| Aspherical Surface [2] | | | | | |
|---|---|---|---|---|---|
| Radius of Curvature | | | −14.61 | | |
| k | 0.0000 | | | | |
| a | −1.4826 × 10$^{-5}$ | | b | −1.7042 × 10$^{-7}$ | |

| Eccentricity [3] | | | | | |
|---|---|---|---|---|---|
| X | 0.00 | Y | 0.00 | Z | 0.00 |
| α | −45.00 | β | 0.00 | γ | 0.00 |

| Eccentricity [4] | | | | | |
|---|---|---|---|---|---|
| X | 0.00 | Y | 0.00 | Z | 0.00 |
| α | 0.00 | β | 0.00 | γ | 0.00 |

| Eccentricity [5] | | | | | |
|---|---|---|---|---|---|
| X | 0.00 | Y | 0.00 | Z | 0.00 |
| α | 45.00 | β | 0.00 | γ | 0.00 |

-continued

|   | Eccentricity [6] |   |   |   |   |
|---|---|---|---|---|---|
| X | 0.00 | Y | −0.19 | Z | 0.00 |
| α | 0.00 | β | 0.00 | γ | 0.00 |

The present embodiment is an example in which a positive power is not provided between the semiconductor laser 1 and the beam splitter.

As understood from the above surface interval, in the present embodiment, it is possible to realize a compact device in which a distance from the laser emitting point 1a to the reflecting surface 5c of measurement is 6.4 mm, and a distance from an end of the concave reflecting surface 6 to a light receiving surface 8 of a sensor is 11.59 mm.

Next, An optical signal switching system 106 which is provided with any one of the deflection angle measuring device 60 according to the first to fifth embodiments is explained.

First, a laser light flux 103 which is transmitted in an input cable 101 reaches on of emitting mouths 101a which are disposed in regular lattice matrix under normal condition of transmitting path. The laser light flux 103 is emitted from there to outside of the input cable 101. The emitted light is condensed by a collimating unit 102 as a parallel beam which is appropriately narrowed such that a part of which parallel beam not be blocked by dusts and emitted toward an optical switching deice 108.

Here, a rotating mirrors 5 which are disposed in a neutral position of back stages in the collimating unit 102 reflect specific laser light fluxes 103 toward specific rotating mirrors 5 which are in a neutral position in the other optical switching device 108 so as to be incident to one of focusing units 107 which correspond to the specific incident mouth 109a in output cable units 105 which are disposed in regular manner. The laser light fluxes transmit through the focusing units 107 to which the laser light fluxes are incident and are focused on an incident mouths 109a in the specific optical cables 101 in the output cable unit 105. The laser light flux 103 is incident thereinside so as to be transmitted further therethrough.

In an optical signal switching system 106 according to the present embodiment, the rotating mirrors 5, 5 are inclined by a predetermined angle from the neutral position so as to change arriving positions of the laser light fluxes 9. For example, in FIG. 1, in a case in which a laser light flux 103a which is emitted from a specific input cable 101A is switched to the output cable 109B from a normal relay condition, first, the deflection angle of the rotating mirror 5A is changed to deflect the laser light flux 103A toward a rotating mirror 5B. The rotating mirror 5B enters another laser light flux 103 to be incident to the output cable 109b in the neutral position under a normal relay condition. In such a case, the defection angle of the rotating mirror 5B is changed such that the laser light flux 103A be incident to the output cable 109B so as to correspond to an incident angle of the laser light flux 109A.

Emitting mouths 110a and incident mouths 109a are disposed in a regular manner. Therefore, the deflection angles of the rotating mirrors 5,5 for making the emitting mouths 101a correspond to the incident mouths 109a are determined previously according to a position relationship of the optical switching devices 108, 108. Thus, it is possible to perform an optical signal switching operation by inclining specific rotating mirrors 5, 5 by a predetermined angle.

Figure 18:
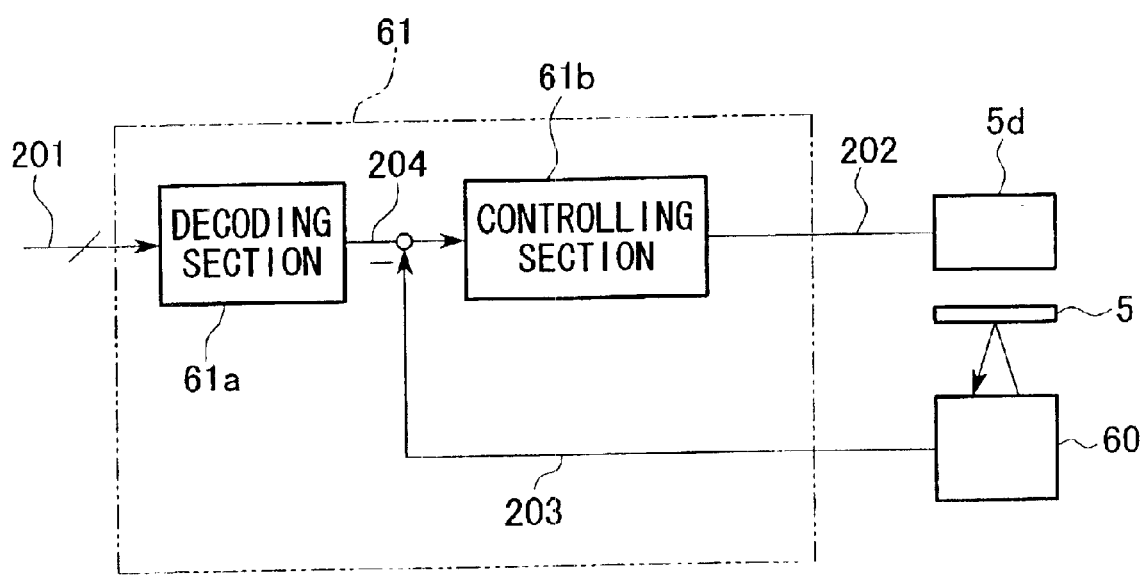
FIG. 18 is a schematic view for showing control blocks for explaining deflection angle measuring method according to the present invention.

By doing this, the deflection angles of the rotating mirrors 5, 5 are measured by the above deflection angle measuring device 60; thus, it is possible to perform a feedback controlling operation for an actuator 5d via the deflection angle controlling device 61 shown in FIG. 18.

Next, the deflection angle controlling device 61 for performing an optical signal switching control by inclining the rotating mirror 5 is explained. In FIG. 18, a controlling block diagram therefor is shown.

More specifically, the deflection angle controlling device 61 comprises a decoding section 61a for decoding a deflection angle controlling signal 201 for specifying the deflection angle and generating a designate level signal 204 which corresponds to the designated deflection angle of the rotating mirror 5 and a controlling section 61b for receiving a difference between a measuring level signal 203 from the deflection angle measuring device 60 and the designated level signal 204 and generating a driving signal 202 for the actuator 5d.

Next, optical signal switching method is explained with reference to FIGS. 1 and 18.

First, an input cable 101A in the laser light flux 103A to which a switching operation is performed and an output cable 109B are specified. Accordingly, information therefore are put into the deflection angle controlling section 61 in each optical switching device 108 by the deflection angle controlling signal 201 from thereoutside so as further to be put into the decoding device 61a.

A designated level signal 204 which corresponds to a designated deflection angle of the rotating mirror 5 is generated by the decoding device 61a. Difference between the designated level signal 204 and the measured level signal 203 based on the measured deflection angle are picked up so as to be put into the controlling section 61b. The difference are amplified, differentiated, or integrated in the controlling section 61b such that the driving signal 202 is adjusted so as to approximate the deflection angle of the rotating mirror 5 to the designated deflection angle. The difference is fed back to the actuator 5d and put out.

As explained above, the feedback controlling operation is performed by using the deflection angle measuring device 60 as a measuring section. Therefore, the deflection angle of the rotating mirror 5 is adjusted to the designated deflection angle. Accordingly, if a disturbance occurs and a difference between the deflection angle and the designated deflection angle occurs, the deflection angle can be adjusted to the designated deflection angle immediately according to the difference amount. That is, by using the optical switching device 108 which is provided with the deflection angle measuring section 61 and the deflection angle measuring device 60, it is possible to realize a real-time feedback controlling operation.

Furthermore, the deflection angle measuring device 60 has a compact structure; thus, it is possible to realize a small optical switching device 108 by making use of space-saving advantage. Also, the deflection angle measuring device 60 which is disposed behind the rotating mirror 5 has a compact structure; therefore, it is possible to narrow the disposition interval of the rotating mirrors 5. Thus, it is possible to narrow the disposition interval of the optical cables 101 in the input cable unit 100 and the output cable unit 105. Thus, the input cable unit 100 and the output cable unit 105 can be made compact. Also, as a result, there is an advantage in that it is possible to increase the transmitting path which can be switched without causing the increase in the deflection angle of the rotating mirror 5.

Such effects are realized by technical features of the present invention in that a light path is returned in a compact manner while condensing a light flux by using a concave reflecting surface which has not been used in a conventional optical signal switching system.

The above explanation describes an example in which a rotating mirror 5 is provided to an emitting mouth 101a in the input cable unit 100. However, transmitting path switching operation is not limited to a case in which the laser light fluxes 103 are switched independently. For example, a case in which a transmitting path is switched for a purpose of backup during a maintenance of the transmitting paths. In such a case, an entire predetermined input cable unit 100 is switched from an output cable unit 105 to another output cable unit 105. In such a case, transmitting paths are switched while maintaining the disposition of the input cable unit; therefore, it is acceptable that a rotating mirror 5 corresponds to an input cable unit 100.

Figure 19:
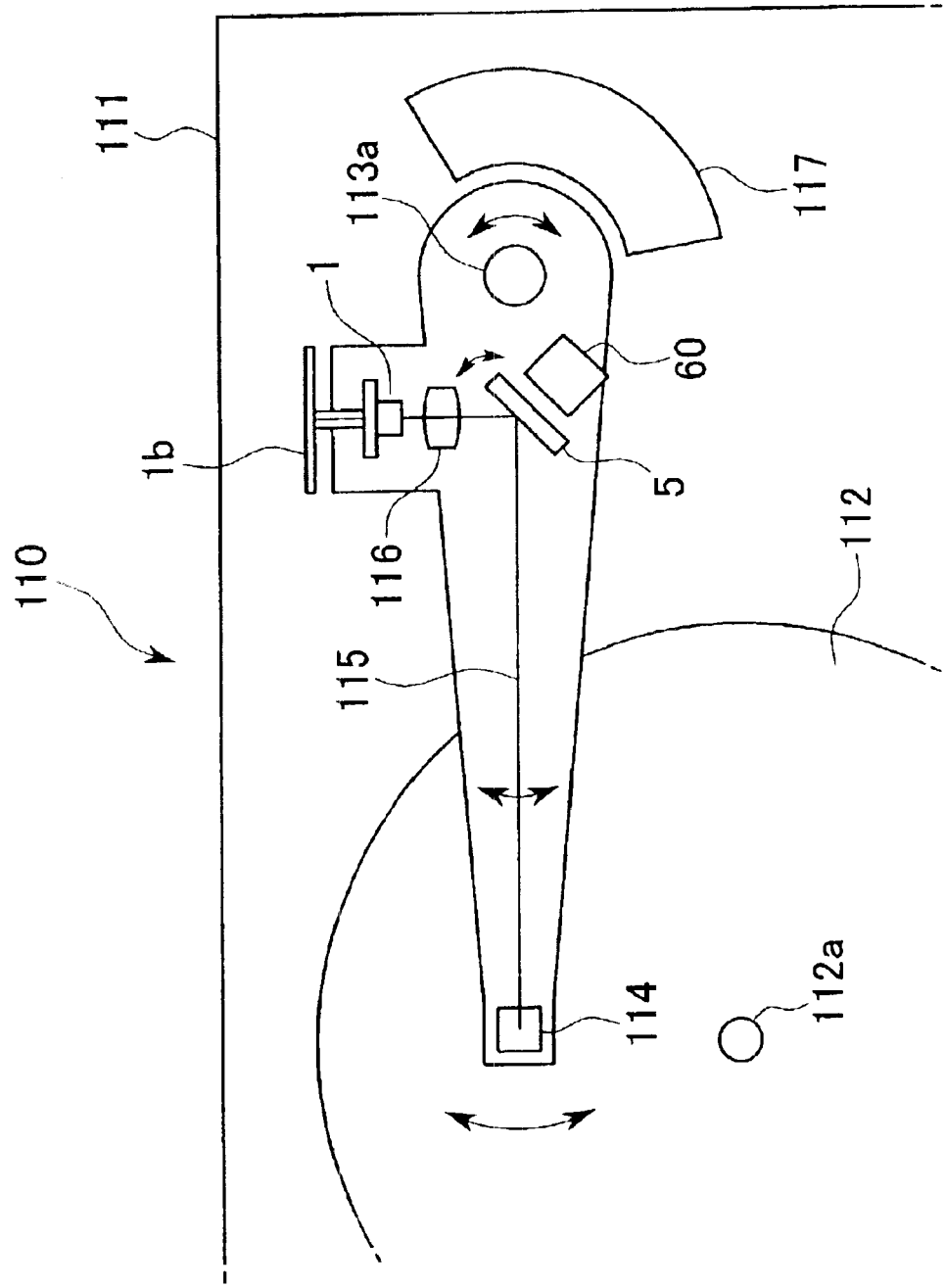
FIG. 19 is a cross section of an information recording and replaying system according to the present invention.

Next, an embodiment of an information recording and replaying system such as a pickup device which is provided with a deflection angle measuring device 60 according to the above embodiment is explained. FIG. 19 is a plan view showing a general structure of an information recording and replaying system 110 according to the present invention.

The present system comprises a recording disk 112 (recording medium) such as an optical disk or an optical magnetic disk for recording and replaying an information signal, a semiconductor laser 1 (light source) for emitting a laser light flux 115 (light flux) in which intensity and pulse width are modulated according to the information signal, a focusing lens 116 and a focusing lens unit 114 for focusing the laser light flux 115, a rotating mirror 5 which is driven by the actuator (not shown in the drawing) so as to perform a fine tracking controlling operation by varying an incident position to the focusing lens unit 114 of the deflected laser light flux 115, an optical system containing a deflection angle measuring device 60, and an arm 113 which can dispose and move the optical system in an orthogonal direction to a parallel direction of a recording surface of the recording disk 112.

The semiconductor laser 1 is connected to a laser driving section 1b for modulating the semiconductor laser 1 according to the information signal.

The rotating mirror 5 can adapt a structure which is shown in FIG. 2. The deflection angle measuring device 60 can adapt any one of the above embodiments.

Reference numeral 111 is a frame in which a recording disk 112 is disposed on a driving shaft 112a which is driven rotationally by a DC control motor or the like. The recording disk 112 is supported so as to freely rotate around the driving shaft 112a.

The recording disk 112 is provided with a recording surface which an optical signal can be recorded to or replayed from. On the recording surface, it is possible to record and/or replay an optical signal. A track signal is formed on a formatted recording disk 112 in a circular direction of the recording surface. Positions for recorded information signal is divided logically in a circular direction.

An arm 113 is disposed above the recording surface and supported so as to face the recording disk 112 flexibly in a vertical direction. The arm 113 is supported by a rotating shaft 113a so as to freely rotate in a parallel direction to the recording surface of the recording disk 112. The arm 113 is driven by a driving coil 117 made of a magnetic coil or the like so as to freely rotate around the rotating shaft 113a.

A focusing lens 116 forms the laser light flux 115 which is emitted from the semiconductor laser 1 appropriately into a parallel beam. A focusing lens unit 114 focuses the laser light flux 115 on the recording surface and receives a reflected light from the recording surface. In the focusing lens unit 114, light receiving elements receive a signal light which corresponds to the information signal, a focus measurement light for performing a focusing control, and a tracking measurement light for performing a tracking control.

The rotating mirror 5 which can move the position of the laser light flux 115 which is incident to the focusing lens unit 114 so as to perform a fine tracking control is disposed between the focusing lens 116 and the focusing lens unit 114 together with the deflection angle measuring device 60. The rotating mirror 5 can adapt a structure shown in FIG. 2. The deflection angle measuring device 60 can adapt any one of above embodiments.

Next, the present system is explained mainly with reference to a tracking controlling operation according to the present invention.

First, the laser light flux 115 is emitted onto the recording surface of the recording disk 112. The reflected light is received in the focusing lens unit 114 so as to pick up the tracking signal. Thus, information such as the position of the track and the difference from the track can be collected. Coarse controlling operation is performed to the rotating position of the arm 113 by the driving coil 117 according to the collected information so as to move among tracks and follow the track.

Furthermore, in order to perform more strict tracking operation, the rotating mirror 5 is inclined so as to deflect the laser light flux 115. The position of the laser light flux 115 which is incident to the focusing lens unit 114 is shifted and the focusing position on the recording surface is finely shifted in a radial direction. Simultaneously, the deflection angle of the rotating mirror 5 is measured by the deflection angle measuring device 60 so as to perform the feedback controlling operation. For the feedback controlling operation, the same method as the optical signal switching method which is explained with reference to FIG. 18 can be adapted.

As explained above, by forming an information recording and replaying system which uses a deflection angle measuring device 60 according to the present invention, first, it is possible to make the deflection angle measuring device 60 compact. Therefore, it is possible to form an arm 113 in a smaller size with lighter weight. Therefore, there is an advantage in that it is possible to enhance mechanical responding characteristics. Second, it is possible to realize a wider measurement range for the deflection angle measuring device 60. Therefore, it is possible to use a larger deflection angle; thus, it is possible to realize a predetermined incident position even if a distance between the rotating mirror 5 and the focusing lens unit 114 is short. As a result, it is possible to shorten the length of the optical path of the optical system on the arm 113. By doing this, it is possible to form the arm 113 in smaller size. Therefore, there is an advantage in that it is possible to realize an information recording and replaying system in compact size with a desirable mechanical responding characteristics.

As explained above, according to the deflection angle measuring device and deflection angle measuring method according to the present invention, an optical path is returned while condensing the light of measurement by a concave reflecting surface. Therefore, there are advantages in that it is possible to measure a deflection angle in a wider range and it is possible to improve the measurement accuracy; thus, it is possible to form the device in compact size.

Also, a compact deflection angle measuring device having a desirable stability in the measurement accuracy and the deflection angle by an optical system having at least a concave reflecting surface is included in the optical signal switching system and optical signal switching method according to the present invention. Therefore, there is an advantage in that it is possible to switch the optical signal accurately in a compact structure.

Also, a compact deflection angle measuring device having a desirable stability in the measurement accuracy and the deflection angle by an optical system having at least a concave reflecting surface is included in an information recording and replaying system according to the present invention. Therefore, there is an advantage in that it is possible to form an entire system in a compact size and it is possible to record and replay the information accurately.

What is claimed is:

1. A deflection angle measuring device for measuring a deflection angle of an optical deflecting element for deflecting a light comprising:
    a light source for emitting a light toward a reflecting surface of measurement for which is provided in the optical deflecting element;
    a beam splitter for changing at least a part of a light path of a reflected light which is reflected at the reflecting surface;
    a concave reflecting surface which is disposed on a light path which is changed by the beam splitter;
    a light measuring device for measuring the deflection angle of the light which is reflected at the concave reflecting surface and deflected by the optical deflecting element according to a light receiving position so as to face the concave reflecting surface.

2. A deflection angle measuring device according to claim 1, wherein
    the beam splitter is a prism which transmits a light which is emitted from the light source; and
    the prism has a beam splitting surface for dividing a light which is reflected by the reflecting surface measurement.

3. A deflection angle measuring device according to claim 2, wherein the concave reflecting surface is disposed on an opposite end to a convex surface which is disposed on the prism.

4. A deflection angle measuring device according to claim 2, wherein, in the prism, a surface which faces the light source has a positive power.

5. A deflection angle measuring device according to claim 4 wherein, in the prism, a surface which faces the light source is a Fresnel lens surface.

6. A deflection angle measuring device according to claim 4 wherein, in the prism, a surface which faces the light measuring device has a negative power.

7. A deflection angle measuring device according to claim 6 wherein, in the prism, a surface which faces the light measuring device is a Fresnel lens surface.

8. A deflection angle measuring device according to claim 6 wherein, in the prism, a surface which faces the light measuring device is an aspherical surface.

9. A deflection angle measuring device according to claim 1 wherein the beam splitter is formed by parallel flat plates which transmit the light emitted from the light source.

10. A deflection angle measuring device according to claim 9 wherein the concave reflecting surface is disposed on an opposite end to a piano-convex lens.

11. A deflection angle measuring device according to claim 9 wherein a lens having a positive power is disposed between the parallel flat plates and the light source.

12. A deflection angle measuring device according to claim 11 the lens having a positive power is a Fresnel lens.

13. A deflection angle measuring device according to claim 9 wherein a lens having a negative power is disposed between the parallel flat plates and the light measuring device.

14. A deflection angle measuring device according to claim 13 wherein the lens having a negative power is a Fresnel lens.

15. A deflection angle measuring device according to claim 13 wherein the lens having a negative power is an aspherical lens having a negative power.

16. A deflection angle measuring device according to claim 1 wherein:
    the beam splitter has a polarized beam splitting surface for transmitting or reflecting a light according to a polarization component; and
    ¼ wavelength plates are disposed between the reflecting surface of measurement and the polarized beam splitting surface and between the concave reflecting surface and the polarized beam splitting surface respectively.

17. A deflection angle measuring device according to claim 16 wherein:
    a polarizing element for converting a light which is incident to the polarized beam splitting surface to a linear polarization is provided between the light source and the polarized beam splitting surface.

18. A deflection angle measuring device according to claim 1 wherein the light source is a semiconductor laser element.

19. A deflection angle measuring device according to claim 1 wherein:
    the light source is a semiconductor laser element;
    a lens having a positive power is disposed in a laser emitting mouth on the semiconductor laser element.

20. A deflection angle measuring device according to claim 19 wherein the lens having a positive power is a Fresnel lens.

21. A deflection angle measuring device according to claim 1 wherein the light measuring device is a one-dimensional position measuring light receptor.

22. A deflection angle measuring device according to claim 1 wherein the light measuring device is a two-dimensional position measuring light receptor.

23. A deflection angle measuring device according to claim 1 wherein the light measuring device is provided with a light receiving surface which is divided in 4 portions.

24. An optical signal switch system comprising:
    an input cable unit which is provided with at least an input cable inside of which an optical signal is transmitted;
    an output cable unit which is provided with at least an output cable which receives the optical signal which is transmitted inside the input cable and transmits thereinside;

an optical switching device which is disposed between the input cable unit and the output cable unit so as to selectively transmit the optical signal which is transmitted from at least one of the input cables to at least one cable in the output cable unit, wherein the optical switching device comprises:

a light deflecting element which is disposed to be inclined at a predetermined deflecting angle so as to selectively change a light path of the optical signal which is transmitted in the input cable; and a deflection angle measuring device for measuring the deflecting angle of the light deflecting element, and the deflection angle measuring device comprises:

a light source which emits a light toward a reflecting surface of measurement which is disposed on the light deflecting element;

a concave reflecting surface for reflecting a light which is reflected at the reflecting surface of measurement; and a light measuring device for measuring a deflection angle of at the light deflecting element according to a light receiving position where the light which is reflected at the concave reflecting surface is received.

25. An optical signal switch system according to claim 24 wherein a beam splitter is provided between the light source and the reflecting surface of measurement so as to reflect a light which is reflected at the reflecting surface of measurement and change a light path of at least a part of the reflected light toward the concave reflecting surface.

26. An optical signal switch system according to claim 25 wherein the beam splitter in the deflection angle measuring device is a prism which transmits a light emitted from the light source.

27. An optical signal switch system according to claim 26 wherein the concave reflecting surface in the deflection angle measuring device is disposed on an opposite end to a convex surface which is disposed on the prism.

28. An optical signal switch system according to claim 26 wherein, in the prism which is disposed in the deflection angle measuring device, a surface which faces the light source has a positive power.

29. An optical signal switch system according to claim 25 wherein a beam splitter in the deflection angle measuring device is formed by parallel flat plates which transmit a light emitted from the light source.

30. An optical signal switch system according to claim 29 wherein the concave reflecting surface in the deflection angle measuring device is disposed on an opposite end to a plano-convex lens.

31. An optical signal switch system according to claim 29 wherein a lens having a positive power is disposed between the parallel flat plates in the deflection angle measuring device and the light source.

32. An optical signal switch system according to claim 25 wherein the beam splitter has a polarized beam splitting surface for transmitting or reflecting a light according to a polarization component; and ¼ wavelength plates are disposed between the reflecting surface of measurement and the polarized beam splitting surface and between the concave reflecting surface and the polarized beam splitting surface respectively.

33. An optical signal switch system according to claim 32 wherein a polarizing element for converting a light which is incident to the polarized beam splitting surface into a linear polarization is provided between the light source and the polarized beam splitting surface.

34. An optical signal switch system according to claim 24 wherein the deflection angle measuring device is any one of the deflection angle measuring device according to claims 1 to 23.

35. An optical signal switch system according to claim 24 wherein the light measuring device is a one-dimensional position measuring light receptor.

36. An optical signal switch system according to claim 24 wherein the light measuring device is a two-dimensional position measuring light receptor.

37. An optical signal switch system according to claim 24 wherein the light measuring device is provided with a light receiving surface which is divided in 4 portions.

38. An optical signal switch system according to claim 24 wherein the light deflecting element is formed by a galvanometer mirror.

39. An optical signal switch system according to claim 24 wherein at least one of an end of the input cable in the input cable unit or an end of the output cable in the output cable unit is disposed in lattice matrix.

40. An optical signal switch system according to claim 24 wherein at least one of the input cable or the output cable is an optical fiber.

41. An information recording and replaying system comprising:

a recording medium having a recording surface which can record and/or replay an information signal by emitting a light thereto;

a light source which emits a light flux for recording and/or replaying the information signal to the recording medium;

an optical system for focusing the light flux on a recording surface on the recording medium;

a light deflecting element which is disposed in the optical system for deflecting the light flux in a surface parallel with the recording surface and has a reflecting surface of which inclination angle changes synchronously according to the deflection angle; and a deflection angle measuring device for measuring the deflection angle of the light deflecting element, wherein the deflection angle measuring device is provided with:

a light source for emitting a light to a reflecting surface of measurement which is disposed on the light deflecting element;

a concave reflecting surface for reflecting a light which is reflected at the reflecting surface of measurement;

a light measuring device for receiving a light which is reflected at the concave reflecting surface and measures the deflection angle at the light deflecting element.

42. An information recording and replaying system according to claim 41 wherein a beam splitter for switching at least a part of a light which is reflected at a reflecting surface to a light path which is directed to a concave reflecting surface is disposed between the light source and the reflecting surface of measurement.

43. Deflection angle measuring method for measuring a deflection angle at a light deflecting element by emitting a light to a reflecting surface of measurement which is disposed on a light deflecting element for deflecting a light by inclining a reflecting surface comprising steps of:

emitting a measurement light on a reflecting surface on the light deflecting element by transmitting a part of a measurement light through a beam splitter;

reentering a light which is reflected at the reflecting surface so as to be incident to a surface of the beam splitter and switching a light path of at least a part of the light;

reflecting the light of which light path is switched at the concave reflecting surface;

receiving a light which is reflected at the concave reflecting surface by the light measuring device; and measuring a position for where the reflected light is received by the light measuring device so as to measure the deflection angle.

44. Optical signal switching method for selectively entering an optical signal which is emitted from at least one of a plurality of input cables to be incident to at least one of a plurality of output cables and transmitting the optical signal in the output cables comprising steps of:

specifying a position of the input cable, among a plurality of input cables, from which the optical signal is emitted and a position of the output cable which is selected;

specifying a deflection angle of a light deflecting element for reflecting a light which is emitted from the input cable of which position is specified to the selected output cable;

emitting a light for measuring the deflection angle to a reflecting surface of measurement which is disposed on the light deflecting element and reflecting the light thereat;

returning a light path of the reflected light via a concave reflecting surface and receiving the reflected light by the light measuring device;

measuring the deflection angle of the light deflecting element according to a position where the light is received;

adjusting the deflection angle of the light deflecting element so as to be a predetermined angle; and entering the optical signal to be incident to the selected output cable such that the optical signal is selectively transmitted.

45. Optical signal switching method according to claim 44 wherein a light for measuring the deflection angle is emitted to a reflecting surface via a beam splitter;

a light which is reflected at the reflecting surface of measurement is reflected at the concave reflecting surface via the beam splitter; and a light transmits through the beam splitter so as to be introduced to the light measuring device.

* * * * *